United States Patent
Kawasaki et al.

(10) Patent No.: US 7,570,501 B2
(45) Date of Patent: Aug. 4, 2009

(54) DC-DC CONVERTER WITH CAPACITOR PRECHARGING AND DUTY RATIO LIMITING

(75) Inventors: Koji Kawasaki, Anjo (JP); Keiji Shigeoka, Nishio (JP); Tsuyoshi Yamashita, Anjo (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 0 days.

(21) Appl. No.: 11/806,213

(22) Filed: May 30, 2007

(65) Prior Publication Data

US 2008/0030293 A1  Feb. 7, 2008

Related U.S. Application Data

(62) Division of application No. 10/892,341, filed on Jul. 16, 2004, now Pat. No. 7,254,046.

(30) Foreign Application Priority Data

Jul. 16, 2003 (JP) .............................. 2003-275643

(51) Int. Cl.
 *H02M 1/36* (2007.01)
(52) U.S. Cl. ............................. 363/49; 323/908; 363/50
(58) Field of Classification Search ............. 363/56.11, 363/56.12, 56.09, 56.01, 56.08, 50, 49; 323/908, 323/901
 See application file for complete search history.

(56) References Cited

U.S. PATENT DOCUMENTS

| | | | |
|---|---|---|---|
| 3,778,677 A | 12/1973 | Kriege | |
| 4,897,773 A | 1/1990 | Bilczo | |
| 5,291,382 A | 3/1994 | Cohen | |
| 5,349,157 A | 9/1994 | Blankenship | |
| 5,684,680 A | 11/1997 | Tahhan et al. | |
| 5,710,697 A | * 1/1998 | Cooke et al. | ............. 363/21.11 |

(Continued)

FOREIGN PATENT DOCUMENTS

EP  0 396 126 A2  11/1990

(Continued)

OTHER PUBLICATIONS

English translation of French Preliminary Search Report issued Jun. 2, 2008.

*Primary Examiner*—Akm E Ullah
*Assistant Examiner*—Harry Behm
(74) *Attorney, Agent, or Firm*—Oliff & Berridge, PLC

(57) ABSTRACT

In a DC to DC converter, first and second primary windings are magnetically coupled to a first secondary winding. Third and fourth primary windings are magnetically coupled to a second secondary winding. The first and second primary windings are magnetically coupled to the first secondary winding. The third and fourth primary windings are magnetically coupled to the second secondary winding. The first and third primary windings are coupled in series to form a first coil member. The second and fourth primary windings are coupled in series to form a second coil member. One end of the first coil member is coupled to the first positive power line. A first switching element is coupled between the first negative power line and the other end of the first coil member. A first capacitor is coupled between the first negative terminal and one end of the second coil member.

3 Claims, 23 Drawing Sheets

U.S. PATENT DOCUMENTS

| | | | |
|---|---|---|---|
| 5,805,434 A * | 9/1998 | Vinciarelli et al. | 363/16 |
| 6,005,780 A | 12/1999 | Hua | |
| 6,128,204 A * | 10/2000 | Munro et al. | 363/41 |
| 6,304,460 B1 | 10/2001 | Cuk | |
| 6,400,582 B1 | 6/2002 | Hemena et al. | |
| 6,496,392 B2 * | 12/2002 | Odell | 363/56.11 |
| 6,801,028 B2 * | 10/2004 | Kernahan et al. | 323/283 |
| 6,922,346 B2 * | 7/2005 | Wofford et al. | 363/41 |
| 6,956,748 B2 | 10/2005 | Nakagawa | |
| 2003/0029654 A1 * | 2/2003 | Shimane et al. | 180/65.4 |

FOREIGN PATENT DOCUMENTS

| | | |
|---|---|---|
| EP | 1 378 988 A2 | 1/2004 |
| JP | A-09-84338 | 3/1997 |
| JP | A-2000-324829 | 11/2000 |
| JP | A-2002-58249 | 2/2002 |
| JP | A-2003-102175 | 4/2003 |

* cited by examiner

D:Q1: ON DUTY RATIO

US 7,570,501 B2

DC-DC CONVERTER WITH CAPACITOR PRECHARGING AND DUTY RATIO LIMITING

This is a Division of application Ser. No. 10/892,341 filed Jul. 16, 2004. The disclosure of the prior application is hereby incorporated by references herein in its entirety.

CROSS REFERENCE TO RELATED APPLICATION

This application is based upon and claims the benefit of priority of the prior Japanese Patent Application 2003-275643 filed on Jul. 16, 2003 so that the contents of which are incorporated herein by reference.

BACKGROUND OF THE INVENTION

1. Field of the Invention

The present invention relates to an improved DC (direct current) to DC converter.

2. Description of the Related Art

DC to DC converters each with a transformer are capable of isolating between input and output thereof so that they have been widely used. In transformer DC to DC converters, various types of them each having two transformers have been well-known.

For one example, Japanese Unexamined Patent Publication No. 2003-102175 discloses a DC to DC converter system including two DC to DC converters. Each of the DC to DC converters has a substantially conventional structure with one transformer. The two DC to DC converters are connected to each other in parallel and they perform complementary operations. In the disclosed DC to DC converter system, alternately current outputs of one and the other transformers allow ripple components to decrease by only lower-capacitance smoothing capacitors without using any choke coils in the output.

For another example, U.S. Pat. No. 5,291,382 discloses a DC to DC converter system having two transformers.

In the structure of the DC to DC converter system related to the disclosure, as shown in FIG. 32, a DC voltage is fed from a DC power supply 102 to the primary winding W101 of a transformer T100 and a primary winding W102 of a transformer T200 through a switching element Q100. As the switching element Q100, a MOS (Metal Oxide Semiconductor) transistor may be used.

The primary windings W102 and W105 are connected in series, and they are connected to a clamp circuit. The clamp circuit is composed of a capacitor C102 and a switching element Q102, such as a MOS transistor, connected to each other in series. The reference characters "D" represent intrinsic diodes of the switching elements Q101 and Q102, respectively. Secondary windings W103 and W106 are connected to each other in series. Voltages applied to the secondary windings W103 and W106 of the transformers T100 and T200 are alternately rectified by a conventional synchronous rectifying circuit 100 to be outputted as output voltages Vo.

The switching elements Q101 to Q104 are PWM (Pulse-Width Modulation) controlled to regulate the output voltages Vo. The switching elements Q101 and Q102 are turned on and off alternately (complementarily).

Operations of the DC to DC converter illustrated in FIG. 32 will be briefly described hereinafter.

(First Mode)

When the switching element Q100 is turned on, the DC voltage is applied to each of the first primary windings W102 and W105 while the switching element Q102 is off state. The DC voltage causes the current i101 to pass from the input terminal through the primary windings W102 and W105 and the capacitor (input smoothing capacitor) C101, which is connected to the DC power supply 102 in parallel, discharges in the discharging direction DD shown in FIG. 32.

The inductances L of the primary windings W102 and W105 cause the current i passing therethrough to ramp up with time, so that voltages are generated in the secondary windings W103 and W106. The polarities of the generated voltages are positive at their dot side terminals, respectively.

When the switching element Q103 is turned on, the current i103 based on the generated voltage in the secondary winding W106 is outputted therefrom, and the magnetic energy based on the generated voltage in the secondary winding W103 is stored in the core of the transformer T100.

(Second Mode)

When the switching element Q101 is turned off, the stored magnetic energy in the transformer T100 causes the voltage at the connecting point 140 between the non dot-side terminal of the secondary winding W105 and the connecting point connecting between the switching elements Q101 and Q102 to increase rapidly. The rapidly increased voltage at the connecting point 140 causes the capacitor C102 to be charged in the charging direction CD through the intrinsic diode D of the switching element Q102.

(Third Mode)

When the switching element Q102 is turned on, the magnetic energy in the transformer T100 causes the capacitor C102 to be effectively charged through the switching element Q102 so that the magnetic energy in the transformer T100 is reduced. After the charge of the capacitor C102 based on the magnetic energy has been completed, the stored voltage in the capacitor C102 causes a current to flow through the switching element Q102 to the primary windings W105 and W102 in the discharge direction illustrated in FIG. 32. That is, the capacitor C102 discharges in the discharging direction DD. The discharged current ramps up with time so that voltages are generated in the primary windings W105 and W102. The polarities of the generated voltages are positive at their non dot-side terminals, respectively.

When the switching element Q104 is turned on, the current i104 based on the generated voltage in the secondary winding W103 is outputted therefrom, and the magnetic energy based on the generated voltage in the secondary winding W106 is stored in the core of the transformer T200.

(Fourth Mode)

When the switching element Q102 is turned off, the stored magnetic energy in the transformer T102 causes the voltage at the connecting point 140 to decrease rapidly. As a result, for discharging the magnetic energy generated in the second transformer T200, the current i102 passes through the input terminal and the intrinsic diode D of the switching element Q101, so that the capacitor C101 is charged in the charging direction CD.

When the switching element Q101 is turned on, the current based on the stored energy in the transformer T200 flows into the capacitor C101 so that the capacitor C101 is charged. After the charging operation from the transformer T200 in the capacitor C101, the operation cycle consisting of first to fourth modes is terminated, returning to the first mode. That is, the operation cycle (First mode to Fourth mode) is repeated.

The structure of the DC to DC converter system illustrated in FIG. 32, however, permits the reverse current to flow out from the transformer T200 toward the input DC power supply 102, which may increase ripple components contained in the input current outputted from the DC power supply 102 and inputted to the transformers T100 and T200.

This may require to reduce the voltage range of the DC power supply 102, thereby reducing the ripple of the input current.

From this requirement, in the DC to DC voltage converter system, a large capacitance capacitor, which is connected in parallel to the input DC power supply 102 as the capacitor (input smoothing capacitor) C101, may be used. The large capacitance capacitor C101 is of large size and expensive, causing the DC to DC voltage converter system to be upsized and the cost thereof to increase.

In addition, the increased ripple components contained in the input current passing through the line connecting between the DC power supply 102 and the DC to DC converter into the transformers T100 and T200 may cause the line to radiate electromagnetic waves, which may require an electromagnetic shield for shielding the electromagnetic waves. The increased ripple components may also increase an effective value of the input current, which may result in increasing loss of energy and heating value of the DC to DC converter system.

Moreover, in the DC to DC converter system illustrated in FIG. 32, the direct current outputted from the DC power supply 102 is inputted to the transformers T100 and T200. This direct current inputted each of the transformers T100 and T200 bias the magnetization of each of the cores, which may cause each transformer to be upsized to suppress the bias magnetic field of each core.

SUMMARY OF THE INVENTION

The present invention is made on the background.

Accordingly, it is an object of the present invention to provide a DC to DC converter capable of reducing ripple components contained in an input current of the DC to DC converter.

According to one aspect of the present invention, there is provided a DC to DC converter connected to first positive and negative power lines and second positive and negative power lines for transferring a DC voltage between the first positive and negative power lines and the second positive and negative power lines. The DC to DC converter comprises a magnetic circuit having a first primary winding, a second primary winding, a third primary winding, a fourth primary winding, a first secondary winding, and a second secondary winding, the first and second primary windings being magnetically coupled to the first secondary winding, the third and fourth primary windings being magnetically coupled to the second secondary winding, the first and third primary windings being coupled in series to form a first coil member, the second and fourth primary winding being coupled in series to form a second coil member, one end of the first coil member being coupled to the first positive power line; a first switching element coupled between the first negative power line and the other end of the first coil member; and a first capacitor coupled between the first negative terminal and one end of the second coil member.

According to another aspect of the present invention, there is provided a DC to DC converter interposed between a first voltage system and a second voltage system for transferring power between the first and second voltage system, wherein the first voltage system has a DC power supply and a power supply switch connected to each other in series. The DC to DC converter comprises: a smoothing capacitor coupled to the first voltage system, the series connected DC power supply and the power supply switch in parallel; and a controller coupled to the power supply switch and configured to, when the power supply switch is off state, transfer power from the second voltage system to the first voltage system to precharge voltage based on the transferred power to the smoothing capacitor and to turn on the power switch after the precharge is completed.

According to a further aspect of the present invention, there is provided a DC to DC converter. The DC to DC convert comprises: a converting circuit comprising: a coil member having a predetermined inductance; a first switching element coupled to the coil member and subjected through the coil member to an input DC voltage, the first switching element being configured to intermittently cause a current to flow into the coil member; and a clamp circuit having a capacitor and a second switching element connected to each other in series, the clamp circuit being connected to the coil member in parallel, the second switching element and the first switching element complementally operating to attenuate magnetic energy generated in the coil member when the first switching element is off state, a controller coupled to the first switching element and the second switching element and intermittently turning on them, the controller controlling to increase an on duty ratio of the first switching element with increasing voltage applied to the first switching element, wherein the controller controls a maximum value of the on duty ratio of the first switching element so that the maximum value is less than a predetermined limit value that decreases with the increase of the input DC voltage.

According to a further aspect of the present invention, there is provided an integrated transformer assembly. The integrated transformer assembly comprises a first coil assembly having a first primary winding, a second primary winding, and a first secondary winding, the first primary winding, the second primary winding, and the first secondary winding are magnetically coupled to each other; a second coil assembly having a third primary winding, a fourth primary winding, and a second secondary winding, the third primary winding, the fourth primary winding, and the second secondary winding are magnetically coupled to each other; and a core body provided with a plurality of core portions and at least one substantially annular slot formed to surround at least one of the plurality of core portions, at least one of the windings in the first coil assembly being contained in the at least one annular slot and wound around at least one of the plurality of core portions, at least one of the windings in the second coil assembly being contained in the at least one annular slot and wound around at least one of the core portions, at least one of the plurality of core portions constituting a common magnetic path of the first and the second coil assemblies.

According to a further aspect of the present invention, there is provided a DC to DC converter connected to first positive and negative power lines and second positive and negative power lines for transferring a DC voltage between the first positive and negative power lines and the second positive and negative power lines. The DC to DC converter comprises: an integrated transformer assembly according to claim 25, the first and third primary windings being coupled in series to form a first coil member, the second and fourth primary winding being coupled in series to form a second coil member, one end of the first coil member being coupled to the first positive power line; a first switching element coupled between the first negative power line and the other end of the first coil member; and a first capacitor coupled between the first negative terminal and one end of the second coil member.

BRIEF DESCRIPTION OF THE DRAWINGS

Other objects and aspects of the invention will become apparent from the following description of embodiments with reference to the accompanying drawings in which.

DETAILED DESCRIPTION OF EMBODIMENTS OF THE INVENTION

Figure 1:
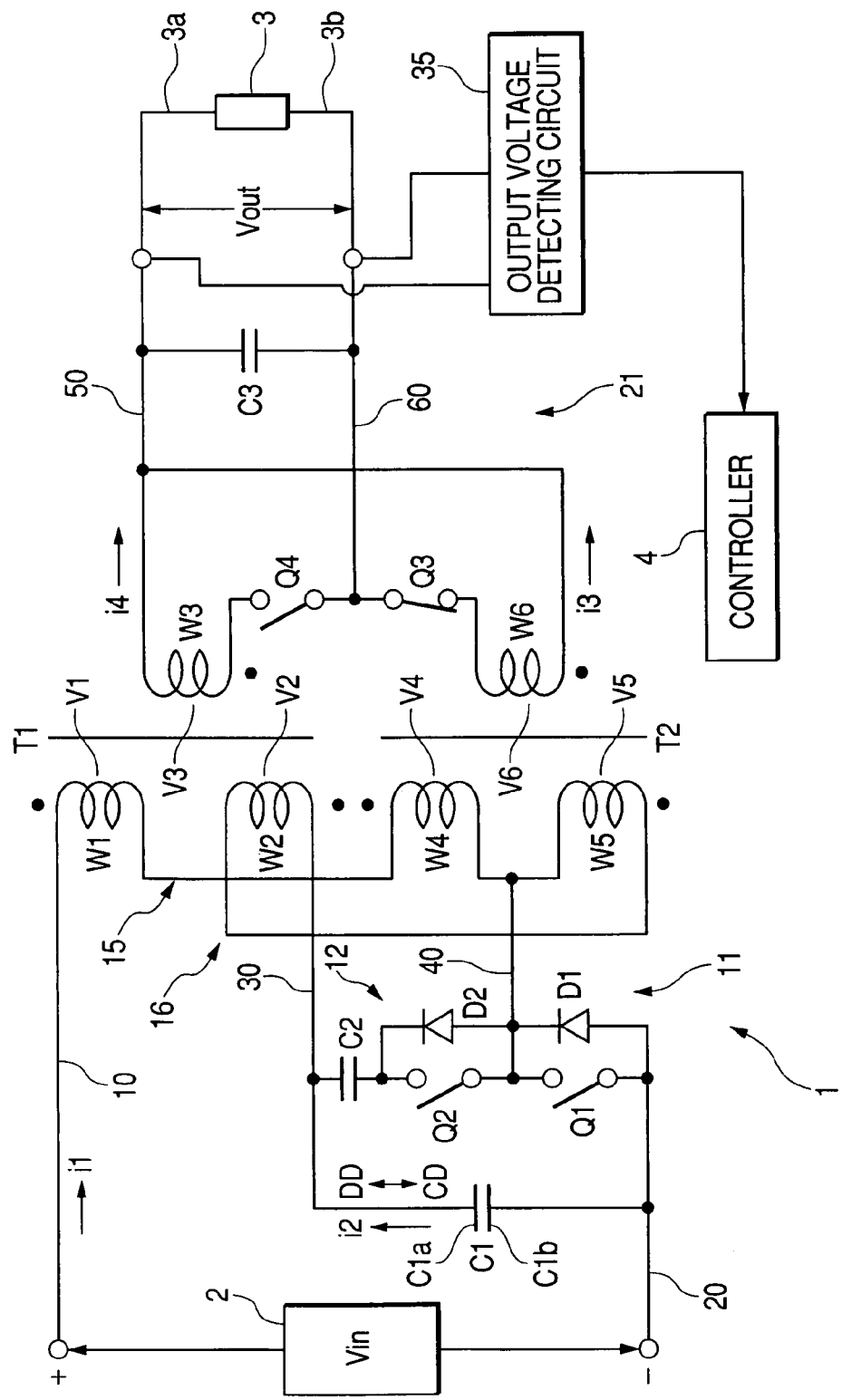
FIG. 1 is a circuit diagram illustrating a circuit structure of a DC to DC converter according to a first embodiment of the present invention.

Embodiments and modifications of DC to DC converters according to the present invention will be described hereinafter with reference to the accompanying drawings.

First Embodiment (Whole Structure of a DC to DC Converter)

The whole structure of a DC to DC converter according to a first embodiment will be explained in accordance with FIG. 1.

The DC to DC converter 1 is served as a unidirectional step down converter, the input side of which is coupled to a high-voltage input DC power supply 2, as a first voltage system.

The output side of the DC to DC converter 1 is coupled to a low-voltage load 3, as a second voltage system.

As the DC to DC converter 1, a unidirectional step up converter may be used, and as the low-voltage load 3, a low-voltage power supply for supplying a DC voltage lower than the high DC voltage may be used.

The DC to DC converter 1 includes a first transformer assembly T1, a second transformer assembly T2, and a first converting circuit 11. The first converting circuit 11 includes a first switching element Q1, a first capacitor C1, and a clamp circuit 12. The clamp circuit 12 consists of a second switching element Q2 and a second capacitor C2.

The DC to DC converter 1 includes a second converting circuit 21 and a controller 4. The second converting circuit 21 consists of a third capacitor C3, a third switching element (an output switching element) Q3, and a fourth switching element (an output switching element) Q4.

The first and second converting circuits 11 and 21, for example, are operative to invert a DC voltage into an AC voltage and convert an AC voltage to DC voltage, respectively.

As each of the first to fourth switching elements Q1 to Q4, an N channel MOS transistor is used in the first embodiment as an example.

The first transformer assembly T1 includes a first primary winding W1, a second primary winding W2, and a first secondary winding W3. The first transformer assembly T1 has a core, preferably with a gap.

The first and second primary windings W1 and W2 are separately wound around the core, and the first secondary winding W3 is wound around the core so that the first and second primary windings W1 and W2 are electromagnetically coupled to the first secondary winding W3.

The winding directions of the respective windings W1, W2, and W3 are previously determined, respectively.

The second transformer assembly T2 is composed of a third primary winding W4, a fourth primary winding W5, and a second secondary winding W6. The second transformer assembly T2 has a core, preferably with a gap.

The third and fourth primary windings W4 and W5 are separately wound around the core, and the second secondary winding W6 is wound around the core so that the third and fourth primary windings W4 and W5 are electromagnetically coupled to the second secondary winding W6.

The winding directions of the respective windings W4, W5, and W6 are previously determined, respectively.

As shown in FIG. 1, the non dot-side terminal of the first primary winding W1 and the dot-side terminal of the third primary winding W4 are connected to each other in series, constituting a first pair of coil members 15. Similarly, the non dot-side terminal of the second primary winding W2 and the dot-side terminal of the fourth primary winding W5 are also connected to each other in series, constituting a second pair of coil members 16.

The positive terminal (+) of the input DC power supply 2 is connected through a connecting line (portion) 10, that is, a positive power line, to the dot-side terminal of the first primary winding W1.

The first converting circuit 11 is connected to the second pair of coil members 16 in parallel.

That is, the dot-side terminal of the second primary winding W2 is connected through a connecting line (portion) 30 to one (C1a) of terminals of the first capacitor C1, and the other (C1b) of the terminals of the first capacitor C1 is connected to the negative terminal (−) of the input DC power supply 2 through a connecting line (portion) 20, that is, a negative power line 20.

The terminal C1b of the first capacitor C1 and the first terminal, such as the source terminal, of the first switching element Q1, are connected in series. The clamp circuit 12 is connected between the second terminal, such as the drain terminal, of the first switching element Q1 and the connecting line 30 so that the clamp circuit 12 is parallely connected to the series circuit (the first capacitor C1 and the first switching element Q1) and the second pair of coil members 16.

The non dot-side terminal of the fourth primary winding W5 and the second terminal (drain terminal) of the first switching element Q1 is connected to each other.

The first terminal, such as the source terminal, of the second switching element Q2 and the second terminal (drain terminal) of the first switching element Q1 are connected to each other. The second terminal, such as the drain terminal, of the second switching element Q2 is connected to one (C2b) terminals of the second capacitor C2. The other (C2a) of the electrodes of the second capacitor C2 is connected through the connecting line 30 to the dot-side terminal of the second primary winding W2.

The connecting point between the second terminal of the first switching element Q1 and the first terminal of the second switching element Q2 is connected through a connecting line (portion) 40 to a connecting point between the non dot-side terminal of the third primary winding W4 and the non dot-side terminal of the fourth primary winding W5.

In addition, the character reference "D1" represents an intrinsic diode of the first switching element Q1, and the character reference "D2" represents an intrinsic diode of the second switching element Q2.

In the second AC to DC circuit 21, the non dot-side terminal of the first secondary winding W3 is connected through a connecting line (portion) 50 to one terminal 3a of the load 3. One terminal of the fourth switching element Q4 is connected to the dot-side terminal of the first secondary winding W3, and the other terminal of the fourth switching element Q4 is connected through a connecting line (portion) 60 to the other terminal 3b of the load 3.

One terminal of the third switching element Q3 is connected to the non dot-side terminal of the second secondary winding W6, and the other terminal of the third switching element Q3 is connected through the connecting line 60 to the other terminal 3b of the load 3.

The dot-side terminal of second secondary winding W6 is connected through the connecting line 50 to the one terminal 3a of the load 3.

On the other hand, the third capacitor C3 is served as a well-known output smoothing circuit, which is connected between the connecting lines 50 and 60 in parallel to the load 3 for smoothing the secondary voltages generated in the secondary windings W3 and W6.

The output smoothing circuit may have the combination of a choke coil and the third capacitor C3.

It is noted that, in the first embodiment, the unit consisting of the windings W1, W2, W4, W5, the capacitors C1, C2, and the switching elements Q1 and Q2 is referred as an input circuit. Similarly, it is noted that, in the first embodiment, the unit consisting of the windings W3, W6, the capacitor C3, and the switching elements Q3 and Q4 is referred as an output circuit.

Each of the switching elements Q1 and Q2 has the control terminal, such as the gate terminal. The gate terminals of the switching elements Q1 and Q2 are connected to the controller 4. In addition, each of the switching elements Q3 and Q4 has the control terminal that is connected to the controller 4. These connections relationships between each of the switching elements Q1-Q4 and the controller 4 are not illustrated in FIG. 1 because of avoiding that FIG. 1 is complicated.

The controller 4 is operative to individually turn on and off the respective switching elements Q1 to Q4. In the first embodiment, the controller 4 is connected to an output voltage detecting circuit 35, and reads the output voltage Vo applied to the load 3 from the output voltage detecting circuit 35.

The controller 4 stores therein a predetermined target voltage, and detects a difference between the predetermined target voltage and the output voltage Vo. The controller 4 executes the PWM control of the on duty ratios of the switching element Q1 through the control terminal according to the difference between the predetermined target voltage and the output voltage Vo, thereby regulating the output voltage Vout to the predetermined target voltage. Incidentally, a carrier frequency in the PWM control is set within several decades to several hundreds kHz (kilohertz). It may be preferable to set the carrier frequency high as much as switching losses and electromagnetic noises are allowable.

As each of the switching elements Q1 to Q4, another switching element, for example, having a junction diode and another transistor, such as IGBT (Insulated Gate Bipolar Transistor) that are parallely connected may be used.

Next, the structure of the input circuit will be described hereinafter.

As described hereinafter, in the first embodiment, the controller 4 executes the PWM control to alternately turn on the first and second switches Q1 and Q2, and dead times normally set between each on state of the first switching element Q1 and each on state of the second switching element Q2 can be negligible.

In this case, the current path except for the current flowing through each of the intrinsic diodes D1 and D2 is simply considered based on a first switch circuit that is configured while the first switching element Q1 is on state, and a second switch circuit that is configured while the second switching element Q2 is on state.

That is, the first switch circuit includes a first circuit unit consisting of the connecting line 10, the first and third primary windings W1 and W4, the first switching element Q1, the connecting line 20, and the input DC power supply 2. The first switch circuit also includes a second circuit unit consisting of the connecting line 20, the first capacitor C1, the second and fourth primary windings W2 and W5, and the first switching element Q1.

Similarly, the second switch circuit includes a third circuit unit consisting of the connecting line 10, the first and third primary windings W1 and W4, the connecting line 40, the second switching element Q2, the capacitor C2, the connecting line 30, the capacitor C1, the connecting line 20, and the input DC power supply 2. The second switch circuit also includes a fourth circuit unit consisting of the connecting line 40, the second switching element Q2, the second capacitor C2, the second and fourth primary windings W2 and W5, and the connecting line 40. Incidentally, a first capacitor charging circuit includes the first and third primary windings W1 and W4, the second and fourth primary windings W2 and W5, and the first capacitor C1, and the first capacitor charging circuit is coupled to the input DC power supply 2.

Next, the structure of the output circuit will be described hereinafter.

In the first embodiment, the third and fourth switching elements Q3 and Q4 constitute a conventional synchronous rectifying circuit so that the third and fourth switching elements Q3 and Q4 are complementarily turned on in accordance with the principle of the synchronous rectifying circuit.

Incidentally, other converting circuits may be used as the third and fourth switching elements Q3 and Q4 (synchronous rectifying circuit).

In this case, the output circuit is simply considered based on a fifth switch circuit unit that is configured while the third switching element Q3 is on state and a sixth switch circuit that is configured while the fourth switching element Q4 is on state.

The fifth circuit unit includes the connecting line 60, the third switching element Q3, the second secondary winding W6, the third capacitor C3, and the connecting line 50. Similarly, the sixth circuit unit consists of the connecting line 60, the fourth switching element Q4, the first secondary winding W3, the third capacitor C3, and the connecting line 50.

Incidentally, any one of the third and fourth switching elements Q3 and Q4 may be replaced into a diode. The third switching element Q3 has the operating state that is substantially identical with that of the first switching element Q1. Similarly, the fourth switching element Q4 has the operating state that is substantially identical with that of the second switching element Q2.

Figure 2:
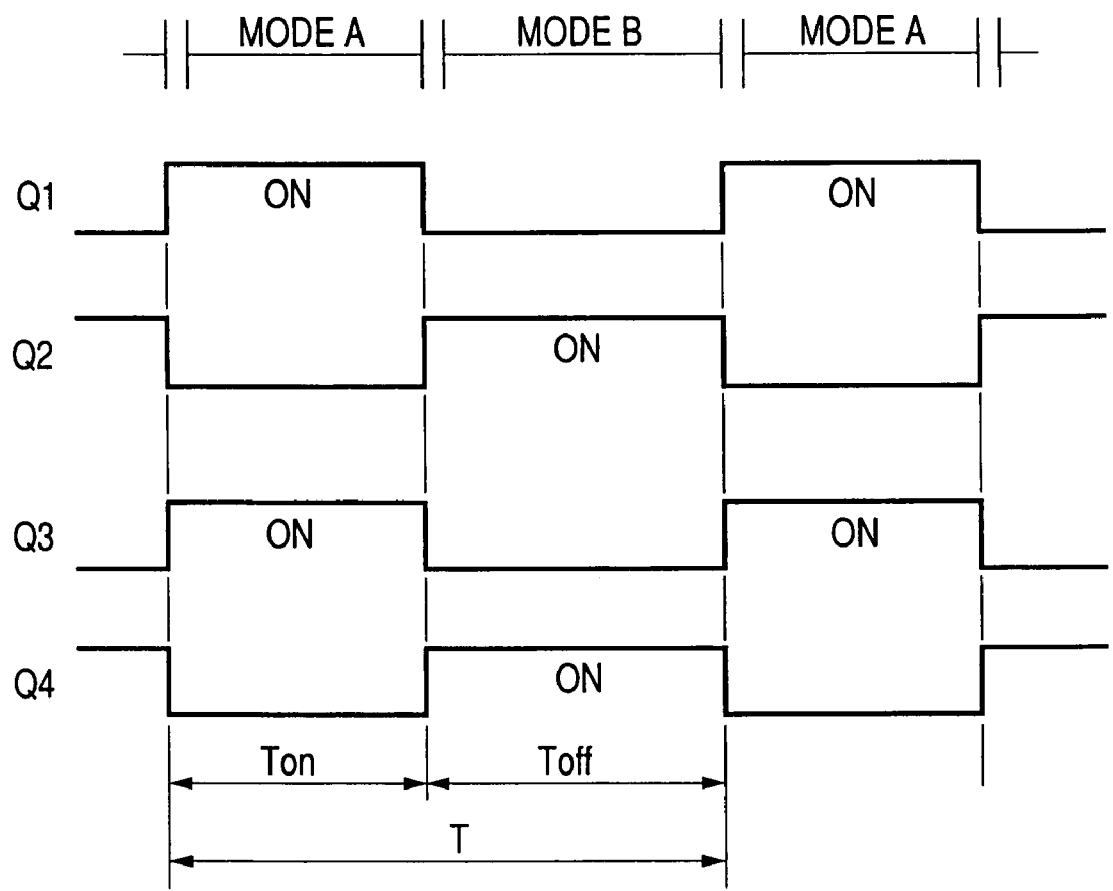
FIG. 2 is a timing chart illustrating operating timings of first to fourth switching elements in operating modes A and B according to the first embodiment of the present invention.
Figure 3:
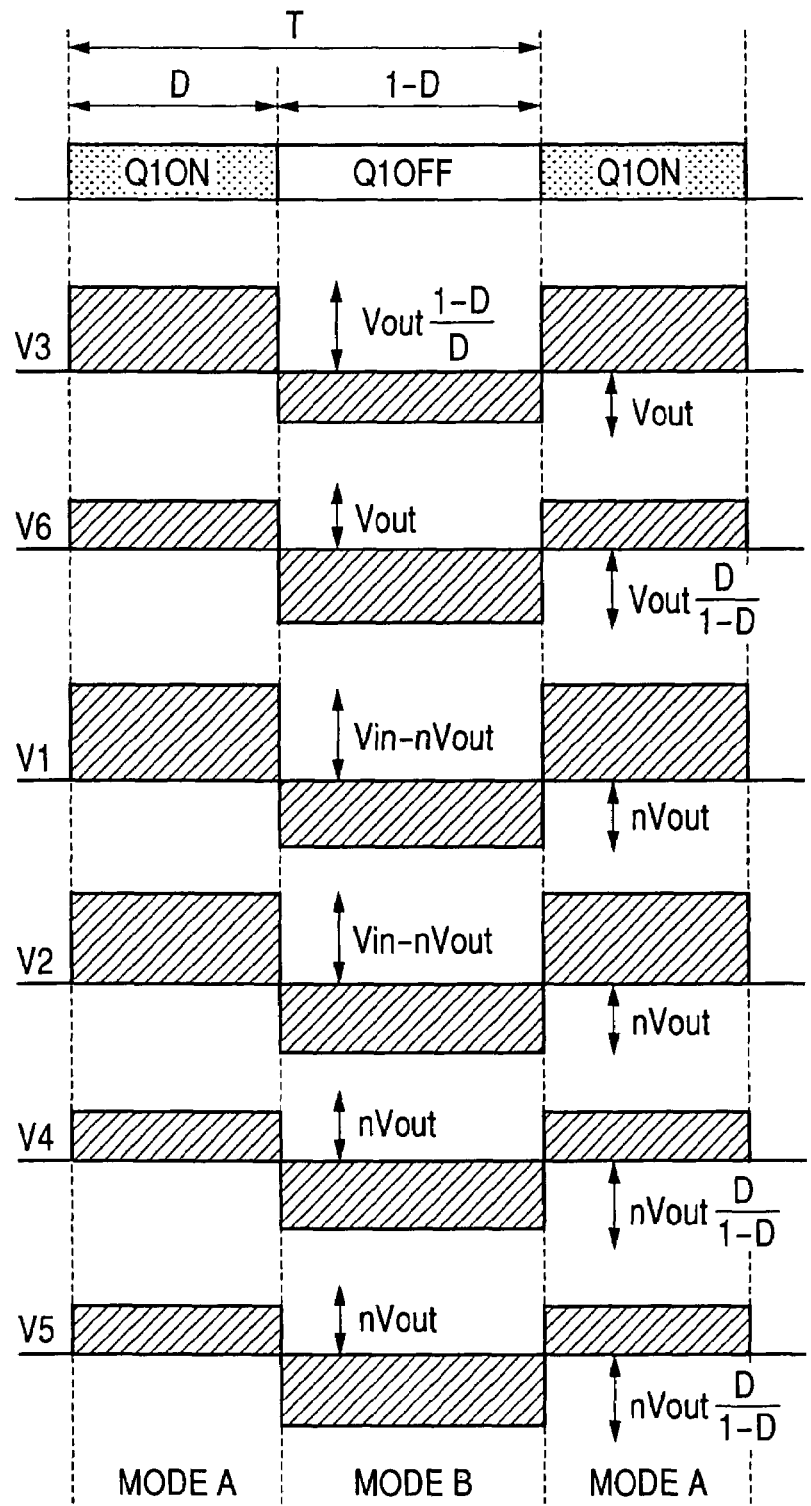
FIG. 3 is a timing chart illustrating translations of voltages of first and second primary windings, a first secondary winding, third and fourth primary windings, and a second secondary winding in the operating modes A and B according to the first embodiment of the present invention.

These operating timings of the first to fourth switching elements Q1 to Q4 in the operating modes A and B, explained hereinafter, are illustrated in FIG. 2 as a timing chart. The transitions of voltages V1 to V6 of the windings W1 to W6 in the operating modes A and B are illustrated in FIG. 3 as a timing chart. Incidentally, the dead times between the operation timings of the first and second switching elements Q1 and Q2 are omitted in FIGS. 2 and 3.

Similarly, the dead times between the operation timings of the third and fourth switching elements Q3 and Q4 are also omitted FIGS. 2 and 3. Moreover, the reference character "D" indicates an on duty ratio of the first switching element Q1, which is represented as an equation of "D (on duty ratio of the switching element Q1)=Ton/T". Where the reference character "Ton" indicates on time of the first switching element Q1, and the reference character "Toff" indicates off time of the first switching element Q1. The reference character "T" indicates the period of the first switching element Q1, which is represented as "Ton+Toff".

In the first embodiment, numbers of turns of the windings W1-W6 are set to n1-n6, respectively. Ratios of the numbers of turns n1-n6 may be variable. It may be preferable that the ratios $n3/n1$, $n3/n2$, $n6/n4$, and $n6/n5$ are equal to each other. That is:

$n3/n1=n3/n2=n6/n4=n6/n5$

The ratio ($n3/n1=n3/n2=n6/n4=n6/n5$) is typically represented as "n".

The output voltage Vout, therefore, is represented by the following equation according to the previously determined parameters:

$$\text{Vout}=n \times D \times \text{Vin}$$

Next, operations of the DC to DC converter 1 will be described hereinafter.

A current supplied from the input DC power supply 2 and inputted to the first primary winding W1 and the third primary winding W4 is assigned to "i1". A current charged in the first capacitor C1 and that discharged therefrom are assigned to "i2". A current outputted through the first secondary winding W3 to the third capacitor C3 is assigned to "i4", and a current outputted through the second secondary winding W6 to the third capacitor C3 is assigned to "i3".

Figure 4:
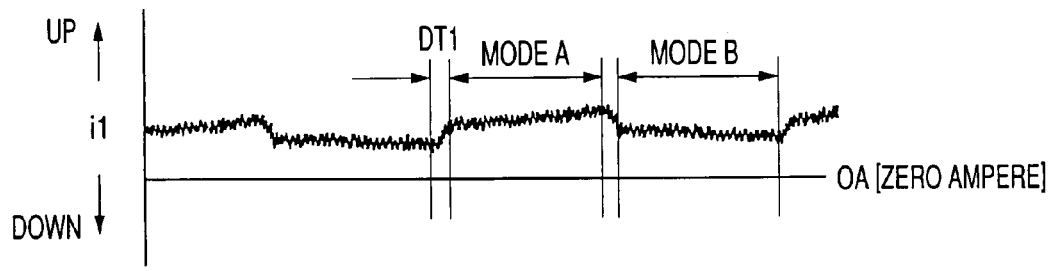
FIG. 4 is a view of a waveform illustrating a current i1 according to the first embodiment of the present invention.
Figure 5:
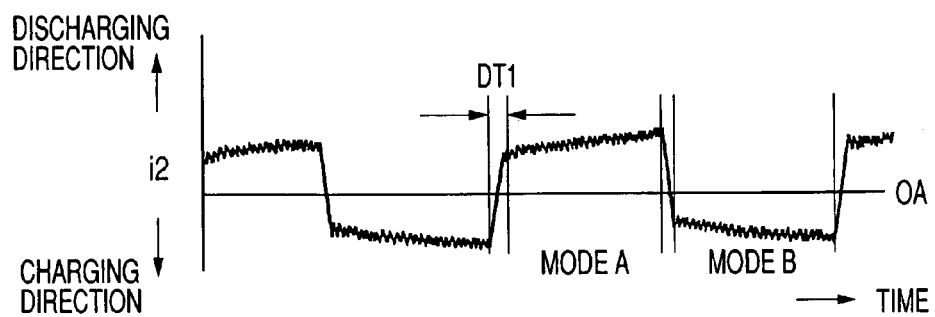
FIG. 5 is a view of a waveform illustrating a current i2 according to the first embodiment of the present invention.
Figure 6:
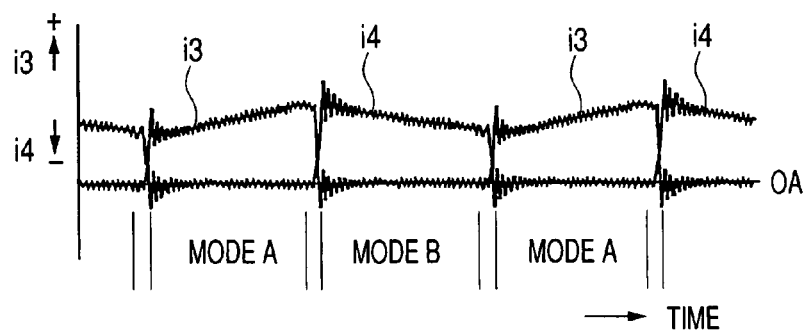
FIG. 6 is a view of waveforms illustrating currents i3 and i4 according to the first embodiment of the present invention.

As set forth above, FIG. 2 illustrates the operating timings of the first to fourth switching elements Q1 to Q4 in the operating modes A and B, and FIG. 3 illustrates the transitions of voltages V1 to V6 of the windings W1 to W6 in the operating modes A and B. In addition, FIG. 4 illustrates the waveform of the current i1 described hereinafter, FIG. 5 illustrates the waveform of the current i2 described hereinafter, and FIG. 6 illustrates the waveforms of the currents i3 and i4 described hereinafter.

Figure 7:
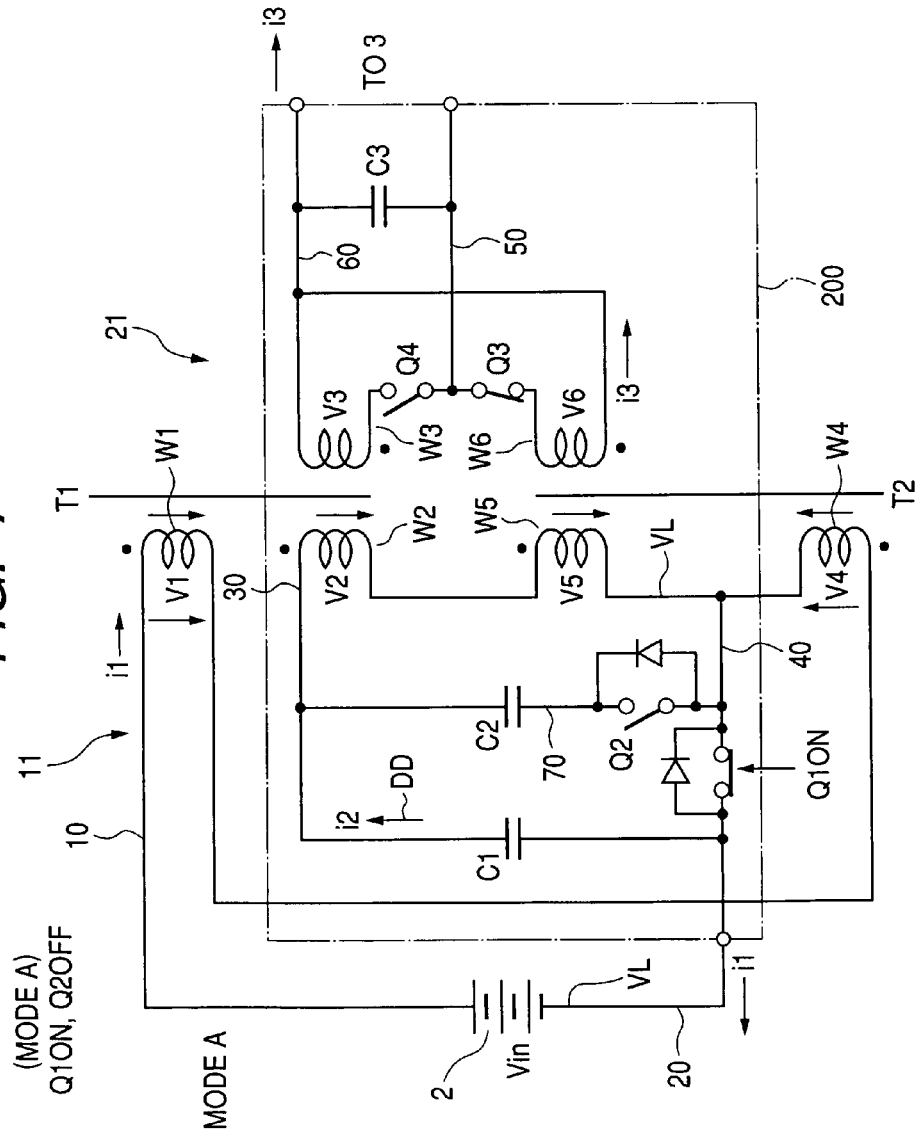
FIG. 7 is a circuit diagram illustrating an equivalent circuit of the DC to DC converter shown in FIG. 1 while a first switching element is on state (a second switching element is off state)
Figure 8:
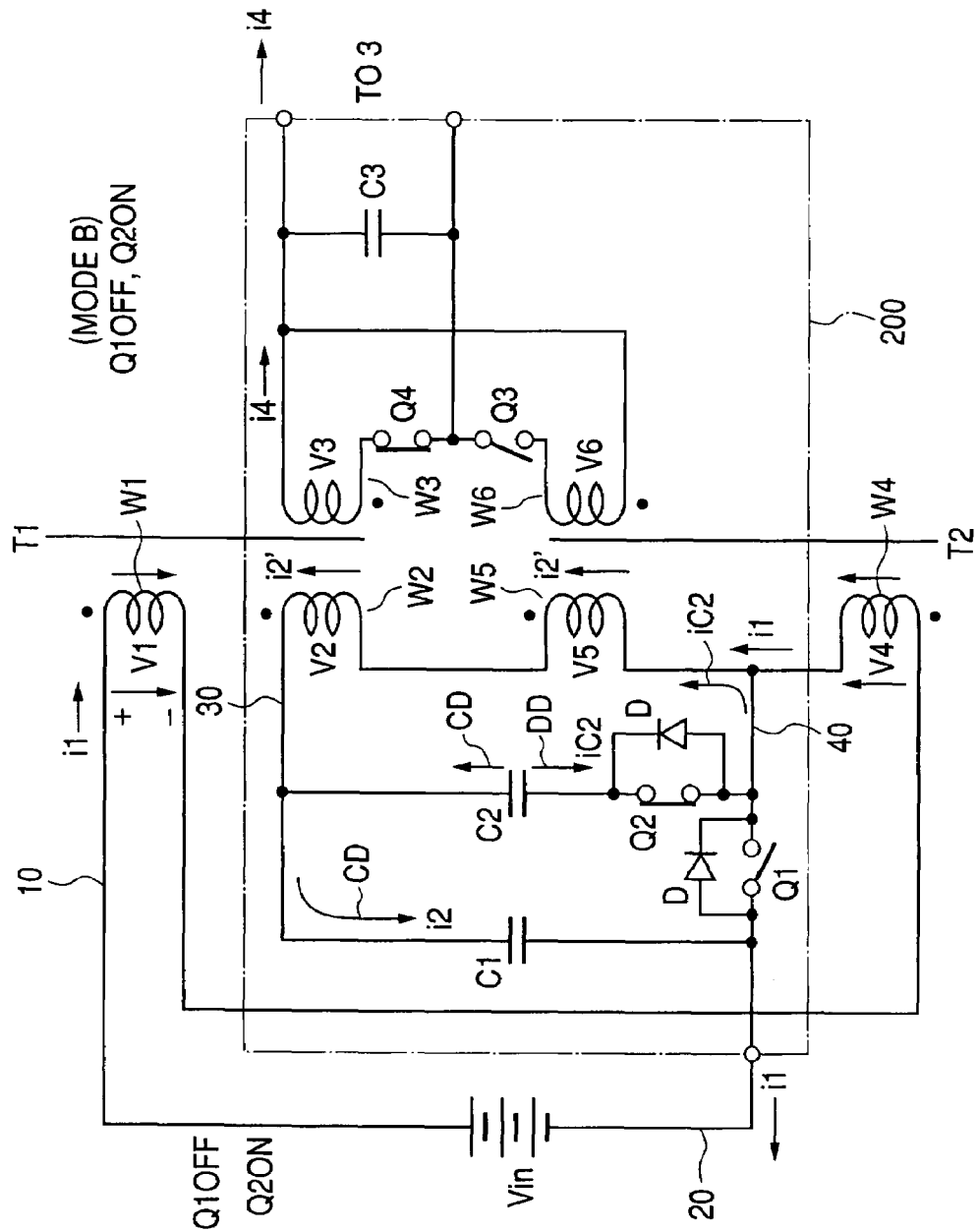
FIG. 8 is a circuit diagram illustrating an equivalent circuit of the DC to DC converter shown in FIG. 1 while the second switching element is on state (the first switching element is off state)

In addition, FIG. 7 illustrates an equivalent circuit of the DC to DC converter shown in FIG. 1 while the first switching element Q1 is on state (the second switching element Q2 is off state). FIG. 8 illustrates an equivalent circuit of the DC to DC converter shown in FIG. 1 while the second switching element Q2 is on state (the first switching element Q1 is off state).

The charging directions CD to the first and second capacitors C1 and C2 are illustrated in FIGS. 7 and 8, and the discharging directions DD from the first and second capacitors C1 and C2 are illustrated in FIGS. 7 and 8. In FIG. 6, the current i3 flowing through the second secondary winding W6 of the second transformer assembly T2 and the current i4 flowing through the first secondary winding W3 of the first transformer assembly T1 are illustrated together. In the mode A, the current i4 is assumed to substantially zero, and, in the mode B, the current i3 is assumed to substantially zero. In FIG. 2, the dead times actually set between each on-time the first switching element Q1 and each on-time of the second switching element Q2 may be preferably set.

In addition, each of the first to fourth switching elements Q1 to Q4 actually rises from the off state to the on state with the predetermined rise time, and falls from the on state to the off state with the predetermined fall time.

As shown in FIG. 2, the first and third switching elements Q1 and Q3 are substantially synchronously turned on and off by the control of the controller 4, and the second and fourth switching elements Q2 and Q4 are substantially synchronously turned on and off by the control of the controller 4. Incidentally, the synchronous turning-on may include in a case where the third switching element (fourth switching element) is turned on after a predetermined time has elapsed since the turning on of the first switching element (the fourth switching element).

In addition, the first and second switching elements Q1 and Q2 are substantially complementarily turned on and off by the control of the controller 4, and the third and fourth switching elements Q3 and Q4 are substantially complementarily turned on and off by the control of the controller 4. As shown in FIG. 2, the controller 4 keeps the first and third switching elements Q1 and Q3 on state in the mode A, and keeps the second and fourth switching elements Q2 and Q4 on state in the mode B.

FIG. 7 shows the DC to DC converter 1 in the mode A so that the first switching element Q1 is on state and the second switching element is off state. In contrast, FIG. 8 shows the DC to DC converter 1 in the mode B so that the first switching element Q1 is off state and the second switching element is on state.

In the first embodiment, the first and second switching elements Q1 and Q2 have the intrinsic diodes D1 and D2, respectively, and a diode's forward voltage drop is approximately 0.7 V. Assuming that, therefore, the potential of the connecting line 20 is ground, such as 0 V [Volts], the potential of the connecting line 40 may be kept to not more than minus 0.8 V.

The structure of the DC to DC converter 1 according to the first embodiment has the feature in that AC current components including ripple components flow into the first and second primary windings W1 and W2. In addition, the AC current components including ripple components flow through the third and fourth primary windings W4 and W5 of the first and second transformer assemblies T1 and T2 by the charging and discharging of the first and second capacitors C1 and C2. That is, DC components hardly flows through the primary windings W2 and W5.

Operations of the DC to DC converter 1 in one cycle (the modes A and B) will be sequentially explained hereinafter.

Incidentally, for simplifying the explanations, the number of turns of each of the windings W1 to W6 of the first and second transformer assemblies T1 and T2 is set to 1 (1 turn) so that magnetomotive forces generated in the windings W1 to W6 are substantially the same with each other. The magnetic resistances of the first and second transformer assemblies T1 and T2 are substantially identical with each other. In each of the windings W1 to W6, an element corresponding to leakage inductance of each winding would be connected to each winding. The leakage inductance, however, is negligible in the explanations hereinafter.

The operations of the DC to DC converter 1 in the one cycle (the modes A and B), under steady state condition are explained.

The operations of the DC to DC converter 1 in the one cycle are explained in accordance with FIGS. 2-8. Incidentally, because it is assumed that the number of turns of each of the windings W1-W6 is set to 1, reference characters of Him (m: natural number) are used to indicative of the magnetomotive forces (ampere-turns) of respective windings W1 to W6, respectively. For example, the magnetomotive forces generated in the windings W1 to W6 are represented as "magnetomotive forces (ampere-turns) Hi1 to Hi6, respectively. Each of the magnetomotive forces (ampere-turn) of each winding has positive or negative sign depending on the direction of the magnetic flux generated in each winding.

(Dead Time Before the Operations in the Mode A)

Before the first switching element Q1 is turned on, that is, when the first switching element Q1 is off state and the second switching element Q2 is on state, the current flows from the second capacitor C2 through the fourth primary winging W5 and the second primary winding W2 into the second capacitor C2. The current flowing into the first capacitor C1 is charged therein as electric energy therein as described hereinafter.

While the first switching element Q1 is off state with the second switching element Q2 being off state, that is, while the DC to DC converter 1 is in the dead time DT1 (see FIG. 4), the leakage inductances of the primary windings W2 and W5 and the output capacitance between both of the first and second terminals of the first switching element Q1 provide an LC circuit. The leakage inductance and the output capacitance, therefore, resonate with each other. In the LC circuit, the energy of the leakage inductance causes the resonance current to flow from the output capacitance, which reduces the voltage across the first switching element Q1.

While the voltage across the first switching element Q1 is substantially zero, the controller 4 controls that the first switching element Q1 is turned on (see FIGS. 2 and 3). This realizes the "soft-switching (zero-voltage switching)" of the first switching element Q1, thereby reducing switching loss and noises of the first switching element Q1.

(Operations in the Mode A)

While the first switching element Q1 is on state with the second switching element Q2 being off state by the control of the controller 4, the current i1 supplied from the input DC power supply 2 passes through the first primary winding W1, the third primary winding W4, and the first switching element Q1 toward the connecting line 20.

On the other hand, the electric energy is stored in the first capacitor C1 in the mode B described hereinafter by the input DC power supply 2 so that the first capacitor C1 has the potential higher than the average voltage Vin of the input DC power supply 2.

In the mode A (first switching element Q1 is on state), therefore, the current i2 discharged from the first capacitor C1 also flows through the second primary winding W2, the fourth primary winding W5, and the first switching element Q1. Each of the currents i1 and i2 increases with time (see FIGS. 4 and 5). The voltages V1, V2, V4, and V5 are generated in the primary windings W1, W2, W4, and W5, respectively. That is, as shown in FIG. 3, the voltage V1 is represented as "Vin−nVout", the voltage V2 is represented as "Vin−nVout", the voltage V4 is represented as "nVout", and the voltage V5 is represented as "nVout".

In the second transformer assembly T2, the third primary winding W4 in which the current i1 flows generates the magnetomotive force (ampere-turn) Hi1 and the fourth primary winding W5 in which the current i2 flows generates the magnetomotive force (ampere-turn) Hi2.

In the first embodiment, the polarities, the numbers of turns and the winding directions of the third primary winding W4 and the fourth primary winding W5 are adjusted so that the direction of the magnetic flux formed by the magnetomotive force Hi1 in the third primary winding W4 and that of the flux formed by the magnetomotive force Hi2 in the fourth primary winding W5 coincide with each other.

This results in that the magnetic flux φ2 corresponding to the sum of the magnetomotive forces (Hi1+Hi2) is generated in the transformer T2.

At that time, the third switching element Q3 is on state and the fourth switching element Q4 is off state, so that the secondary winding side of the first transformer assembly T1 is opened. This results in that the energized windings W1 and W2 are served as choke coils so that the currents i1 and i2 flowing through the energized windings W1 and W2 have ripple components, respectively. That is, the currents i1 and i2 have ramped AC waveforms, respectively (see FIGS. 4 and 5).

The change of the magnetic flux φ2 generated in the primary winding side of the second transformer T2 causes the secondary voltage V6 to be induced in the second secondary winging W6 whose magnitude depends on the change of the magnetic flux φ2 (see FIG. 3). The secondary voltage V6 is represented as "Vout".

In the first embodiment, the winding direction of the second secondary winding W6 is adjusted so that the secondary voltage V6 outputs the current i3 through the load 3. Because the currents i1 and i2 have ripple components, the current i3 outputted from the second secondary winding W6 also have ripple components so that the current i3 has a ramped AC waveform (see FIG. 6).

Regarding the load 3 as a resistor, the current i3 whose magnitude is proportional to the secondary voltage V6 flows through the load 3. In response to the current i3 flowing out from the second transformer assembly T2, the current i1 flowing through the third primary winding W4 and the current i2 flowing through the fourth primary winding W5 increase, respectively (see FIGS. 4 to 6).

That is, the current i1 flowing through the third primary winding W4 and the current i2 flowing through the fourth primary winding W5 correspond to magnetizing current components in the second transformer assembly T2 and the current i3. This results in that the combination of the current i2 except for the magnetizing current components and the current i1 is outputted from the second secondary winding W6 as the current i3.

That is, the increase of the magnetomotive force due to the increase of the current i1 flowing through the third primary winding W4 and that of the magnetomotive force due to the increase of the current i2 flowing through the fourth primary winding W5 of the second transformer assembly T2 are combined to form a combined magnetomotive force within the on-period of the first switching element Q1 in the mode A.

The combined magnetomotive force causes the secondary voltage V6 to be generated in the second secondary winding W6 so that the current i3 is outputted from the second secondary winding W6. In other words, the increase of the magnetic flux based on the increase of the current i1 through the third primary winding W4 and that of the magnetic flux based on the increase of the current i2 through the fourth winding W5 cause the current i3 to be outputted from the second secondary winding W6.

On the other hand, because the currents i1 and i2 flows through the energized windings W1 and W2, and the fourth switching element Q4 is off state, the magnetic energy generated in the first transformer assembly T1 is stored therein.

(At the Off Timing of the First Switching Element Q1)

When the first switching element Q1 is turned off, if no clamp circuit 12 is provided in the input circuit, the energy stored in both magnetized and leakage inductances of each of the primary windings would have nowhere to flow, causing an infinite spike voltage (surge voltage) to occur across the first switching element Q1.

The clamp circuit 12, however, allows the energy to flow its second capacitor C2 so that the energy is charged in the second capacitor C2, making it possible to avoid surge voltage.

(Dead Time Before the Operations in the Mode B)

Before the second switching element Q2 is turned on, that is, when the second switching element Q2 is off state and the first switching element Q1 is off state, the charge of the energy into the second capacitor C2 causes the voltage across the first switching element Q1 to increase. The increased voltage across the first switching element Q1 is larger than the input voltage Vin.

It is noted that the maximum of the voltage across the first switching element Q1, which is equivalent to the potential of the connecting line 40 because the connecting line 20 is ground, is represented as the following equation:

$$V\max(Q1)=V\text{in}/(1-D)+a$$

Where "Vmax(Q1)" represents the voltage across the first switching element Q1, and "a" represents voltage variations due to the fluctuations of the load 3, heat loss and/or parasitic components.

At that time, the surge voltages due to the inductance components of the primary windings cause the second capacitor C2 to be charged through the intrinsic diode D2 of the second switching element Q2. Because the first and second switching elements Q1 and Q2 are off state, the energy components of both magnetized and leakage inductances of the first to fourth primary windings W1, W2, W4, and W5 cause the current i1 and i2 to decrease within the dead time DT2 (see FIGS. 4 and 5). That is, the waveforms of the current i1 and i2 are ramped in the dead time DT2 in a direction opposite to the currents i1 and i2 in the dead time DT1.

(Operations in the Mode B)

When the second switching element Q2 is turned on with the first switching element Q1 being off state by the control of the controller 4, the current i1 supplied from the power supply 2 passes through the first, third and fourth primary windings W1, W4, and W5, and the second primary winding W2 into the first capacitor C1 to be charged therein.

On the other hand, because the electric energy has been stored in the second capacitor C2 so that the second capacitor C2 has the potential higher than the potential at the connecting line 40 corresponding to the Vmax(Q1) of the first switching element Q1.

In the mode B, therefore, the current iC2 discharged from the second capacitor C2 also flows through the second switching element Q2, the fourth primary winding W5, and the second primary winding W2.

The voltages V1, V2, V4, and V5 are generated in the primary windings W1, W2, W4, and W5, respectively. That is, as shown in FIG. 3, the voltage V1 is represented as "nVout", the voltage V2 is represented as "nVout", the voltage V4 is represented as "nVout(1−D)/D", and the voltage V5 is represented as "nVoutD/(1−D)".

In the first transformer assembly T1, the decrease of the current i1 flowing into the first primary winding W1 causes the magnetic flux generated in a predetermined direction to decrease. The current difference in the second primary winding W2 from the current i2 in the mode A to the current i2' in the mode B causes the decrease of the magnetic flux generated in the predetermined direction to contribute.

In addition, at that time, the third switching element Q4 is off state and the fourth switching element Q5 is on state, so that the secondary winding side of the second transformer assembly T2 is opened.

The change of the current i1 through the first primary winding W1 from increase to decrease and that of the current i2' from the current i2 cause the secondary voltage V3 to be generated in the first secondary winding W3. The magnitude of the secondary voltage V3 is proportional to the rate of the magnetic flux change due to the changes of the currents i1 and i2' (see FIG. 3). The secondary voltage V3 is represented as "Vout".

In the first embodiment, the winding direction of the first secondary winding W3 is determined so that the secondary voltage V3 outputs the current i4 through the load 3. Because the currents i1 and i2' have ripple components, the current i4 outputted from the first secondary winding W3 also have ripple components so that the current i4 has a ramped AC waveform (see FIG. 6).

Regarding the load 3 as a resistor, the current i4 whose magnitude is proportional to the secondary voltage V3 flows through the load 3. In response to the current i4 flowing out from the first transformer assembly T1, the current i1 flowing through the first primary winding W1 and the current i2' flowing out from the second primary winding W2 increase, respectively (see FIGS. 4 to 6). The current equivalent to the combination of the current i2' except for the magnetizing current components of the first transformer assembly T1 and the current i1 flowing through the first primary winding W1 is outputted from the first secondary winding W3 as the current i4.

That is, the decrease of the magnetomotive force due to the decrease of the current i1 flowing through the first primary winding W1 and that of the magnetomotive force due to the decrease of the current i2' flowing through the second primary winding W2 of the first transformer assembly T1 are combined to form a combined magnetomotive force within the on-period of the second switching element Q2 in the mode B.

The combined magnetomotive force causes the secondary voltage V3 to be generated in the first secondary winding W3 so that the current i4 is outputted from the first secondary winding W3. In other words, the decrease of the magnetic flux based on the decrease of the current i1 through the first primary winding W1 and that of the magnetic flux based on the change of the current through the second winding W2 from the current i2 to the current i2' cause the current i4 to be outputted from the first secondary winding W3.

On the other hand, because the currents i1 and i2' flows through the energized windings W4 and W5, and the third switching element Q3 is off state, the magnetic energy generated in the second transformer assembly T2 is stored therein.

(Flow of Power in the DC to DC Converter)

Figure 9:
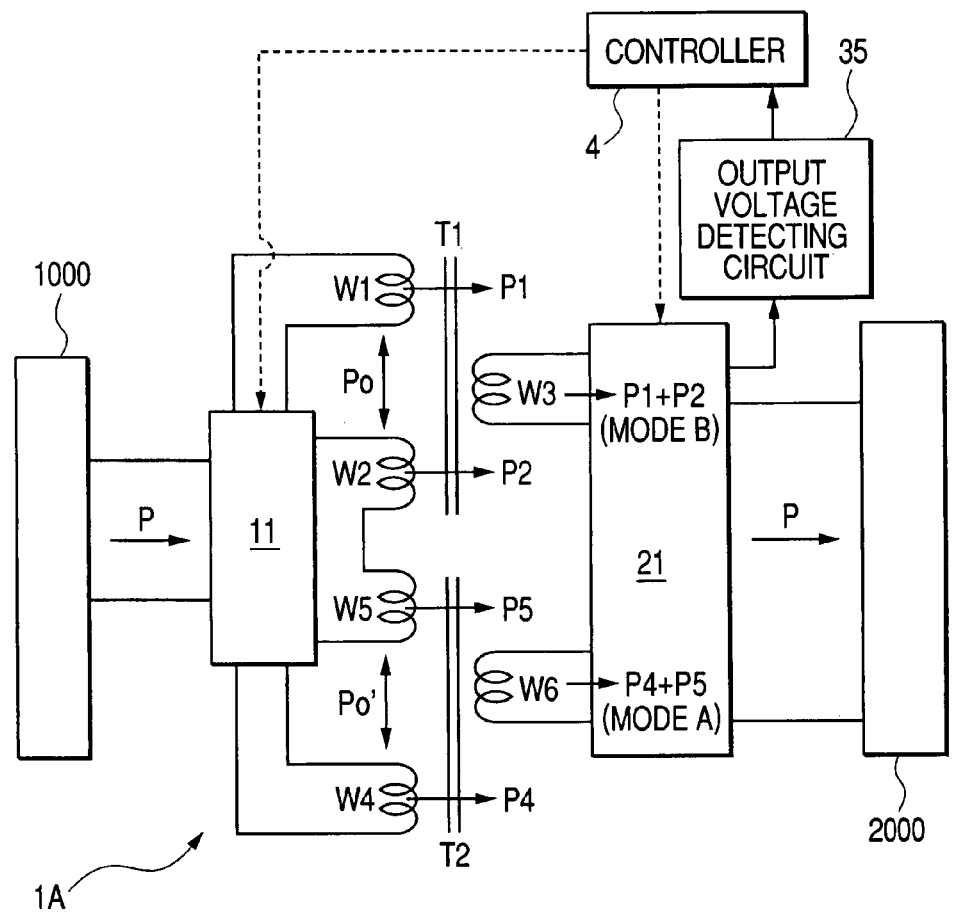
FIG. 9 is a circuit diagram of generalized DC to DC converter illustrated in FIG. 1.

FIG. 9 is a circuit diagram of generalized DC to DC converter 1 illustrated in FIG. 1.

In the generalized DC to DC converter 1A illustrated in FIG. 9, reference character 1000 represents the first voltage system (the input DC power supply 2), and reference character 11 and 21 represent the first and second converting circuits, respectively. Reference character 2000 represents the second voltage system corresponding to the load 3 and including a battery. In FIG. 9, the DC to DC converter 1A is configured to supply electric power from the first voltage system 1000 to the second voltage system 2000.

The first converting circuit 11 is configured to convert DC power outputted from the first voltage system into AC power, thereby supplying the converted AC power to the first transformer assembly T1.

The first converting circuit 21 is configured to convert AC power outputted alternately from the first transformer assembly T1 or the second transformer assembly T2 into DC power, thereby supplying the converted DC power to the second voltage system 2000. The first primary winding W1 and the third primary winding W4 are connected in series to form the first pair of coil members 15, and the second primary winding W2 and the fourth primary winding W5 are connected in series to form the second pair of coil members 16.

The first converting circuit 11, as described above, is composed of the first switching element Q1, the first capacitor C1, and the clamp circuit 12. The clamp circuit 12 is composed of the second switching element Q2 and the second capacitor C2. The first converting circuit 11 is operative to supply the converted alternative current to the second pair of coil members (W2, W5). Direct current components may be overlapped on the alternative current, but the direct current components contribute to the transfer of power through the first and second transformer assemblies T1 and T2.

The first pair of coil members 15 comprises the first primary winding W1 electromagnetically coupled to the second primary winding W2 and the first secondary winding W3. The first pair of coil members 15 also comprises the third primary winding W4 electromagnetically coupled to the fourth primary winding W5 and the second secondary winding W6. The first primary winding W1 and the third primary winding W4 are connected in series. The first pair of coil members 15 is connected through the first switching element Q1 to the negative side of the first voltage system 1000.

This structure causes the DC input current i1 to flow through the first pair of coil members 15 during the period for which the first switching element is on state so that the first capacitor C1 discharges. This results in that the input current i1 flows through the first pair of coil members 15 when the first capacitor C1 is charged and the first capacitor C1 discharges, reducing ripple components included in the input current i1. The ripple components include the carrier frequency, or its high-frequency components, but gradual fluctuations and surge currents are not included in the ripple components.

The second pair of coil members 16 is operative to output power from the fourth primary winding W5 during the period for which the first switching element Q1 is on state. The second pair of coil members 16 is also operative to output power from the second primary winding W2 during the period for which the first switching element Q1 is off state.

The first capacitor C1 is charged through the first pair of coil members 15 and the second pair of coil members 16 from the first voltage system 1000. That is, when the first capacitor C1 is charged, the power is transferred from the second primary winding W2 of the second pair of coil members 16 to the first secondary winding W3 thereof.

When the first switching element Q1 is on state so that the first capacitor C1 discharges, the power is transferred from the fourth winding W5 of the second pair of coil members 16 to the second secondary winding W6 thereof.

In the mode B, the first converter 11 outputs the power through the second transformer assembly T2 and the fourth primary winding W5 while charging the first capacitor C1. In the next mode, the first converter 11 outputs, as power, the energy stored in the first capacitor C1 through the second primary winding W2.

The increase of the input current i1 when the first switching element Q1 is on state with the first capacitor C1 discharging allows the first primary winding W1 of the first pair of coil members 15 to store the magnetic energy therein and to be served as a choke coil. This increase of the input current i1 also allows the third primary winding W4 to transfer the power to the second secondary winding W6.

In contrast, the decrease of the input current i1 when the first switching element Q1 is off state with the first capacitor C1 being charged permits the first primary winding W1 to transfer the power to the first secondary winding W3 and the third primary winding W4 to store the magnetic energy therein and to be served as a choke coil.

This configuration allows the ripple components included in the input current i1 to further decrease.

That is, the flow of the power is represented as follows.

While the first switching element Q1 is on state so that the first capacitor C1 discharges, the energy P5 is transferred from the fourth primary winding W5 to the second secondary winding W6, and the energy P4 is transferred from the third primary winding W4 to the second secondary winding W6. The first transformer assembly T1 is served as a choke coil for storing the magnetic energy.

While the first switching element Q1 is off state so that the first capacitor C1 is charged, the energy P1 is transferred from the first primary winding W1 to the first secondary winding W3, and the energy P2 is transferred from the second primary winding W2 to the first secondary winding W3. The second transformer T2 is served as a choke coil for storing the magnetic energy. The stored magnetic energy is effectively used.

As described above, in the DC to DC converter 1 described above, even if the on state period of the first switching element Q1 and the off state period thereof are changed, the currents i3+i4 will be substantially continuous currents. The input current i1 continuously flows from the input DC power supply 2 to the DC to DC converter 1. This allows substantially no adverse input currents inputted to the input DC power supply 2 to occur, making it possible to eliminate the use of a smoothing capacitor parallely connected to the input DC power supply 2.

Some power is transferred from the first primary winding W1 and third primary winding W4 to the first and second secondary windings W3 and W6 due to the ripple components included in the input current i1. Almost power, however, is transferred by reversing the current flowing through the second and fourth windings W2 and W5 between the mode A and the mode B. This allows large power to be transferred to the secondary sides of the transformer assemblies T1 and T2 while keeping the ripple components in the input current small. Moreover, it is possible to reduce the capacitance of the first capacitor C1 as compared with a smoothing capacitor parallely connected to the input DC power supply 102 illustrated in FIG. 32.

The first transformer assembly T1 in the mode A is served as a choke coil, and the second transformer assembly T2 in the mode B is also served as a choke coil. These choke coil functions permit the current flowing through the first and third primary windings W1 and W4 to be linearly changed, and the current flowing through the second and fourth primary windings W2 and W5 to be linearly changed. This allows the output current outputted from the secondary sides of the transformer assemblies T1 and T2 to be stabilized.

As a first modification of the first embodiment, the winding direction of the second primary winding W2 with respect to the first primary winding W1 may be reversed as compared with the winding direction of the second primary winding W2 according to the first embodiment. Similarly, the winding direction of the third primary winding W4 with respect to the fourth primary winding W5 may be reversed as compared with the winding direction of the third primary winding W4 according to the first embodiment. The turn ratio between the number of turning of each of the first and third primary windings W1 and W4, and the one between the second and fourth primary windings W2 and W5 may be set to 1 or another positive number.

As a second modification of the first embodiment, the ratios between the leakage inductances of the transformer assemblies T1, T2 and the magnetizing inductances may be set as usage. It may be preferable to set the ratios so that the ripple components contained in the input current and those contained in the output current are reduced within a broad duty ratio range.

In the first embodiment, each of the first and second transformer assemblies T1 and T2 has preferably the core (magnetic path) with the gap for avoiding the tendency of generating magnetic saturation due to the DC components inputted to the transformer assemblies T1 and T2. The core with the gap may be unnecessarily for each of the transformer assemblies T1 and T2. In particular, because the DC components contained in the current flowing through the second transformer assembly T2 are small, it may be preferable to narrow or omit the gap in the core.

In the first embodiment, the step down DC to DC converter is used as an example of the DC to DC converter. Changing turn ratios between each first primary winding of each transformer assembly and each secondary winding of each transformer assembly allows the step down DC to DC converter to be used as a step up DC to DC converter.

Moreover, in the first embodiment, the third switching element Q3 and the fourth switching element Q4 are complementarily operated to perform the synchronous rectification. The positions of the first secondary winding W3 and second secondary winding W6 may be replaced into the positions of the third and fourth switching elements, such as rectifying diodes. At least one of the third and fourth switching elements Q3 and Q4 may be replaced into a rectifying diode.

Furthermore, in the first embodiment, the input circuit, which has the first switching element Q1, the second switching element Q2, the first capacitor C1, and the second capacitor C2, is used to input the DC power from the power supply to convert the input DC power into AC power, thereby supplying it to the transformer assemblies T1 and T2. Moreover, a synchronous rectifying circuit, which has a third switching element Q3, a fourth switching element Q4, and the third capacitor C3, is used as the output circuit for supplying the power to the battery. In the present invention, however, the transfer direction of the power may be reversed with respect to the structure of the above DC to DC converter.

The core of the first transformer assembly T1 and that of the second transformer assembly T2 may be configured to have a common magnetic path as an incorporated core. In addition, the core of the first transformer assembly T1 and the core of the second transformer assembly T2 may be disposed in parallel to each other.

A primary winding may be collectively wound around both of the parallely disposed columnar portions of the cores of the first transformer assembly T1. This structure allows the first primary winding W1 and the third primary winding W4 to be common.

Similarly, a primary winding may be collectively wound around both of the parallely disposed columnar portions of the cores of the second transformer assembly T2. This structure allows the second primary winding W2 and the fourth primary winding W5 to be common.

Second Embodiment

A DC to DC converter according to a second embodiment of the present invention will be described in accordance with FIG. 10. In the second embodiment, the controller 4 of the DC to DC converter controls the on duty ratio of the first switching element Q1 within a predetermined range X centered at 50 percents, such as 40 to 60 percents. The DC to DC converter is used for applications which does not require a wide range of the on duty ratio.

Figure 10:
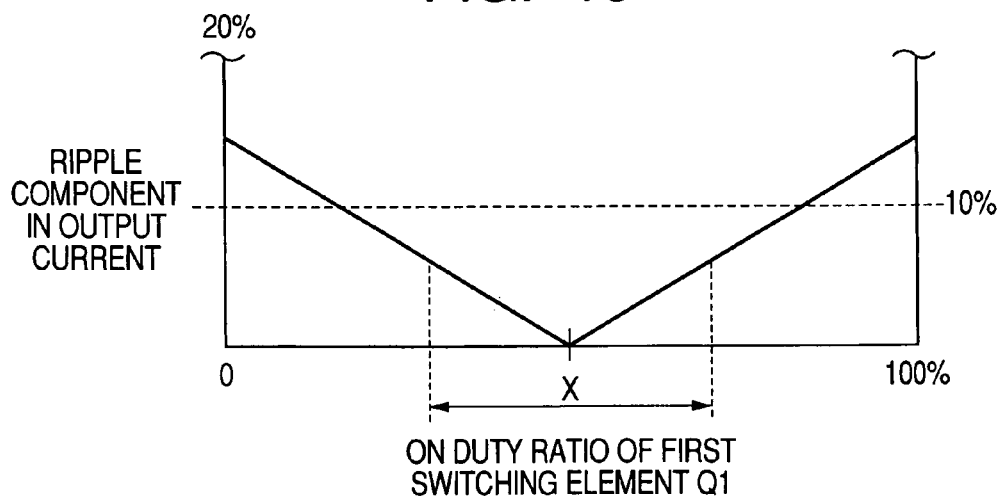
FIG. 10 is a graph illustrating a relationship between ripple components contained in an output current and an on duty ratio of the first switching element according to a second embodiment of the present invention.

This structure of the DC to DC converter according to the second embodiment allows the ripple components contained in the output current io (i3+i4) to be reduced less than a predetermined percents, such as 10 percents (see FIG. 10). The ratio (percents) of the ripple components contained in the output current io have a characteristic that continuously varies depending on the on duty ratio of the first switching element Q1 (see FIG. 10). The predetermined value of the on duty ratio corresponding to the minimum value of the ratio of the ripple components contained in the output current depends on various circuit constants of the DC to DC converter, especially, the magnetic resistances of the first and second transformer assemblies T1 and T2.

If electromagnetic characteristics of the first and second transformer assemblies T1 and T2 are substantially identical with each other, the ripple components contained in the output current io may become zero when the on duty ratio of the first switching element Q1 is 50 percents, thereby making the characteristic of the output current io with time flat.

Third Embodiment

A DC to DC converter according to a third embodiment of the present invention will be described in accordance with FIG. 11. In the third embodiment, the DC to DC converter 1B is served as a bidirectional DC to DC converter.

That is, the DC to DC converter 1B has a primary circuit (PC) 300 for the transformer assemblies T1 and T2, which corresponds to the circuit composed of the capacitors C1, C2, the switching elements Q1, Q2, and the connections thereamong, the transformer assemblies T1 and T2, and the input DC power supply 2. The DC to DC converter 1B also has a synchronous rectifying circuit (SC) 400, which corresponds to the circuit composed of the switching elements Q3, Q4, the capacitor C3, and the connections thereamong, the transformer assemblies T1 and T2, and the load, such as a power supply 3.

The DC to DC converter 1B has a controller 500 corresponding to the controller 4 shown in FIG. 1, and a driver 600 connected between each of the first and second switching elements Q1 and Q2 and the controller 500 for turning on and off each of the switching elements Q1 and Q2. The DC to DC converter 1B also has a driver 700 connected between each the third and fourth switching elements Q3 and Q4 and the controller 500 for turning on and off each of the switching elements Q3 and Q4. The controller 500 executes the PWM control through the drivers 600 and 700 in similar manners according to the first embodiment.

In particular, according to the third embodiment, for transferring power from the power supply 2 as the first voltage system 1050 to the power supply 3 as the second voltage system 2050, the controller 500 previously stores therein a first predetermined target voltage, and reads the output voltage applied to the power supply 3 from the output voltage detecting circuit 35 (step S1).

Figure 11:
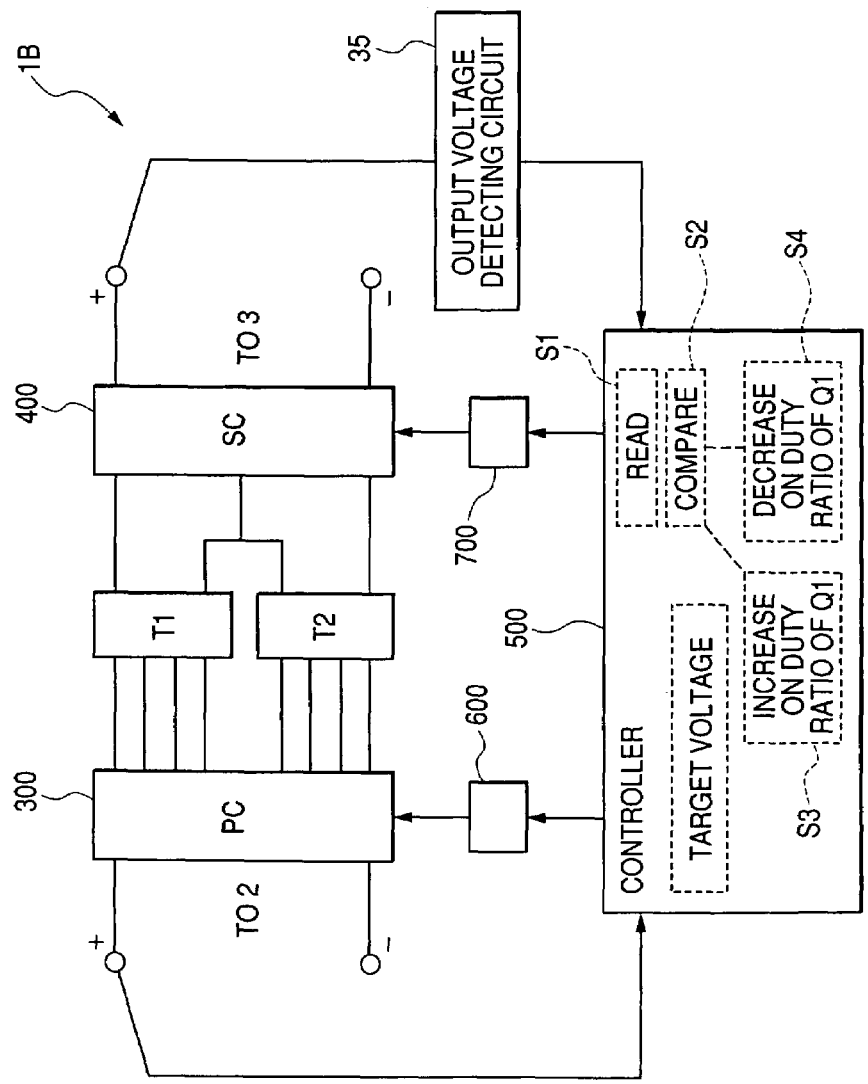
FIG. 11 is a circuit diagram illustrating a circuit structure of a DC to DC converter according to a third embodiment of the present invention.

Next, the controller 500 compares the first predetermined target voltage with the output voltage to determine whether the output voltage is larger than the predetermined target voltage (see a process S2 in FIG. 11).

The controller 500 controls through the driver 600 to increase the on duty ratio of the first switching element Q1 when the output voltage is smaller than the first predetermined target voltage (see a process S3 in FIG. 11). When the output voltage outputted from the synchronous rectifying circuit 400 is larger than the first predetermined target voltage, the controller 500 controls through the driver 600 to decrease the on duty ratio of the first switching element Q1 (see a process S4 in FIG. 11). This feed back control of the controller 500 allows the power to be transferred from the power supply 2 to the power supply 3 while the output voltage of the power supply 3 converges to the target voltage.

Similarly, for transferring power from the power supply 3 to the power supply 2, the controller 500 reads the input voltage, such as input voltage Vin in the first embodiment) (see the process S1 in FIG. 11).

Next, the controller 500 compares a second predetermined target voltage with the input voltage to determine whether the input voltage is larger than the second predetermined target voltage (see the process S2 in FIG. 11).

The controller 500 controls through the driver 600 to decrease the on duty ratio of the first switching element Q1 when the input voltage is smaller than the second predetermined target voltage (see the process S4 in FIG. 11). When the input voltage is larger than the second predetermined target voltage, the controller 500 controls through the driver 600 to increase the on duty ratio of the first switching element Q1 (see the process S3 in FIG. 11). This feed back control of the controller 500 allows the power to be transferred from the power supply 3 to the power supply 2 while the input voltage of the power supply 2 converges to the target voltage.

This embodiment is more effective in a case where the primary circuit 300 corresponding to the first converting circuit 11 is coupled to the first voltage system 1050, such as a DC power supply or a DC load without interposing any current smoothing choke coil. Similarly, this embodiment is more effective in a case where the synchronous rectifying circuit 400 corresponding to the converting circuit 21 is coupled to the second voltage system 2050, such as a DC power supply or a DC load.

That is, in the third embodiment, alternately turning on the third and fourth switching elements Q3 and Q4 in synchronization with the turning on and off of the first switching element Q1 permits the output current to be continuously outputted through one of the switching elements Q3 and Q4.

This results in that ripple components contained in the output current are reduced, allowing output choke coil to be omitted.

When transferring power from the synchronous rectifying circuit 400 to the primary circuit 300 through the first and second transformer assemblies T1 and T2, surge currents are hardly generated, making it possible to omit any circuits required for attenuating or reducing the surge currents due to the choke coil.

In addition, in the third embodiment, it is possible to switch over the transferring direction of the power by only changing the on duty ratios of the switching elements.

In contrast, it is assumed to execute bidirectional power transfer in conventional bidirectional power transfer DC to DC converters.

In this case, when reversely transferring an ordinary rectifying circuit to an ordinary inverter circuit, because large amount of ripple components may be included in the output current, it may be difficult to omit a choke coil in the conventional DC to DC converter, which reduces the ripple components from the output current.

When the rectifying circuit in the conventional DC to DC converter operates as an inverter, the switching surge voltages are generated in the choke coil, which requires any circuits required for attenuating or reducing the surge voltages (surge currents) due to the choke coil.

In the conventional DC to DC converter, therefore, it is difficult to avoid the circuit system of the conventional DC to DC converter from being complicated.

The DC to DC converter according to the third embodiment, however, needs not necessarily choke coils, making it possible to execute bidirectional power transfer without complicating the circuit system.

In addition, in the third embodiment, the change of the on duty ratio of the first switching element Q1 allows the transferring direction of the power to be smoothly and simply switched.

Fourth Embodiment

Figure 12:
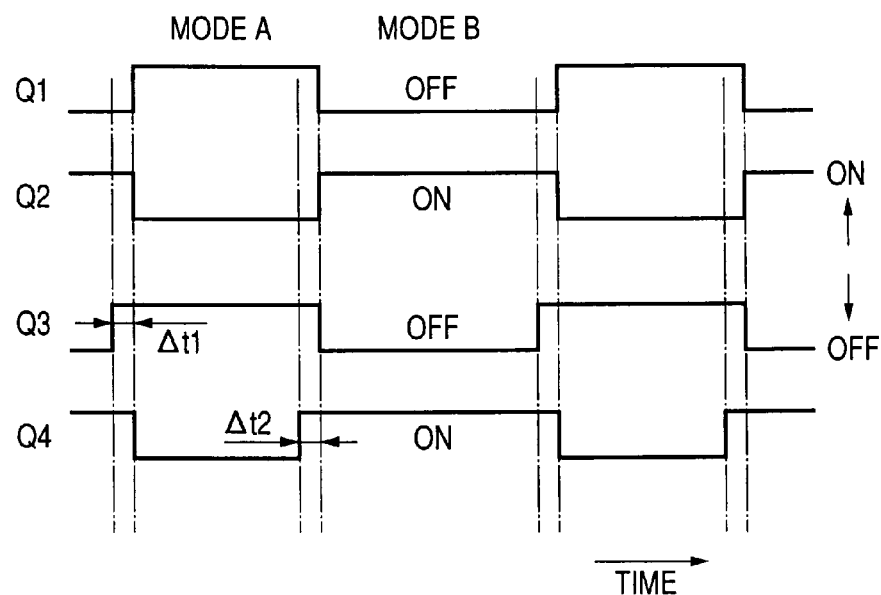
FIG. 12 is a timing chart illustrating operating timings of first to fourth switching elements in operating modes A and B according to a fourth embodiment of the present invention.

A DC to DC converter according to a fourth embodiment of the present invention will be described in accordance with FIG. 12. In the fourth embodiment, the controller 4 of the DC to DC converter controls the turn on timing of the third switching element Q3 to advance it from the turn on timing of the first switching element Q1 by a predetermined time of Δt1. Similarly, the controller 4 of the DC to DC converter controls the turn on timing of the fourth switching element Q4 to advance it from the turn on timing of the second switching element Q2 by a predetermined time of Δt2, which may be equal to or different from the Δt1.

This configuration allows the third switching element Q3 and the fourth switching element Q4 to be short-circuited when switching the third switching element Q3 from the off state to the on state and switching the fourth switching element Q4 from the off state to the on state. The short-circuit current flowing through the short-circuit of the third and fourth switching elements Q3 and Q4 permits surge voltages generated at the switching timings to be reduced without using a snubber circuit. The short-circuit of the third and fourth switching elements Q3 and Q4 also allows power generated at the switching timings to be electromagnetically collected by the transformer assemblies T1 and T2.

Fifth Embodiment

Figure 13:
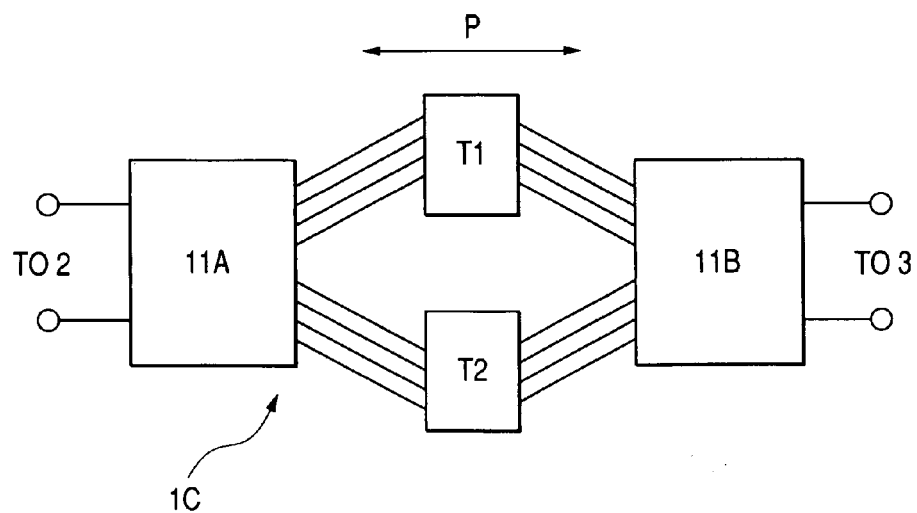
FIG. 13 is a circuit diagram illustrating a circuit structure of a DC to DC converter according to a fifth embodiment of the present invention.

A DC to DC converter according to a fifth embodiment of the present invention will be described in accordance with FIG. 13. In the fifth embodiment, the DC to DC converter 1C has a first converting circuit 11B corresponding to the first converting circuit 11 shown in FIG. 1 in place of the synchronous rectifying circuit (switching elements Q3 and Q4, and capacitor C3). That is, as shown in FIG. 13, the first converting circuit 11B is composed of the capacitors C1, C2, the switching elements Q1, Q2, and the connections thereamong, the transformer assemblies T1 and T2, and the load 3. Incidentally, reference character 11A represents the original first converting circuit 11 shown in FIG. 1.

In particular, the first switching element Q1' of the first converting circuit 11B is disposed to correspond to the fourth switching element Q4 of the DC to DC converter 1. The second switching element Q2' of the first converting circuit 11B is disposed to correspond to the third switching element Q3 of the DC to DC converter 1.

In the DC to DC converter 1C, the controller 4 controls that the on of the first switching element Q1 and the on of the first switching element Q1' are opposite in phase, and the on of the second switching element Q2 and the on of the second switching element Q2' are opposite in phase.

Sixth Embodiment

Figure 14:
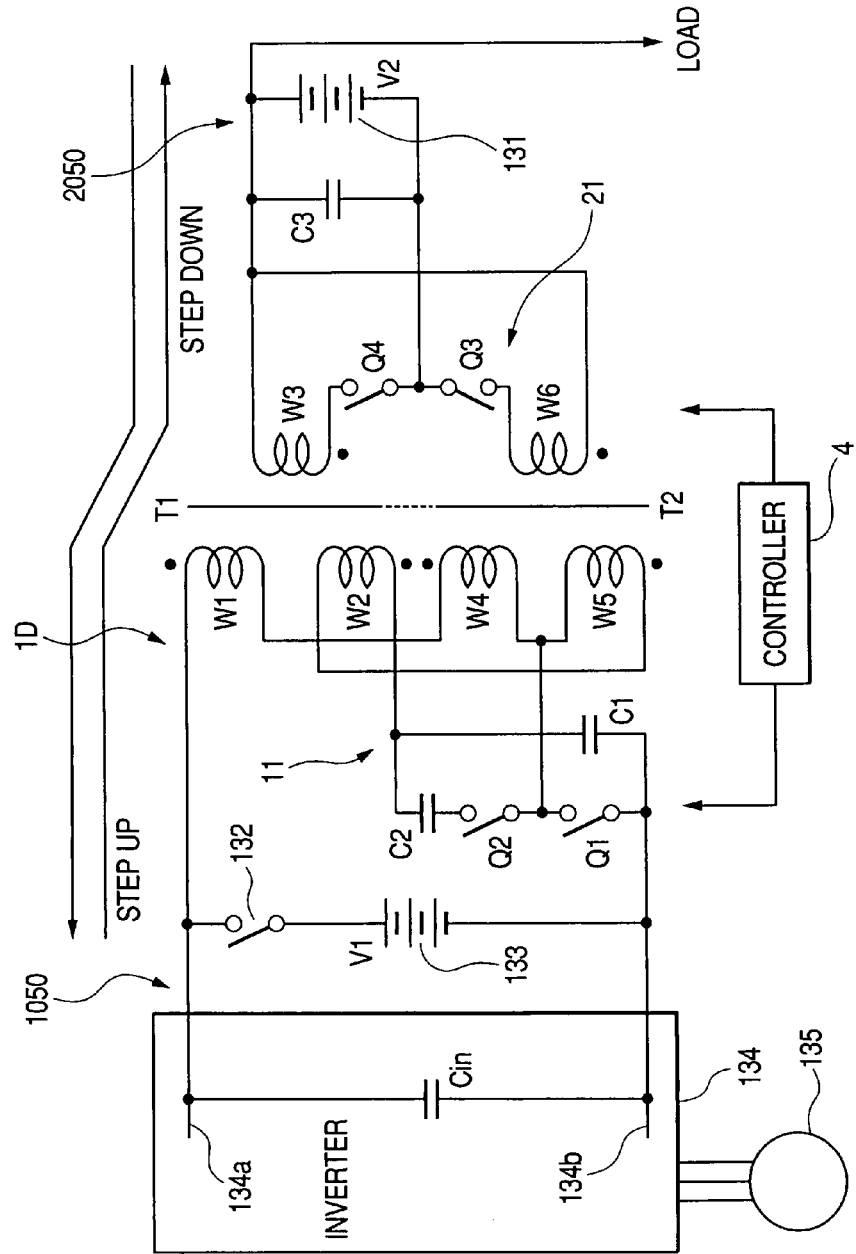
FIG. 14 is a circuit diagram illustrating a circuit structure of a DC to DC converter according to a sixth embodiment of the present invention.
Figure 15:
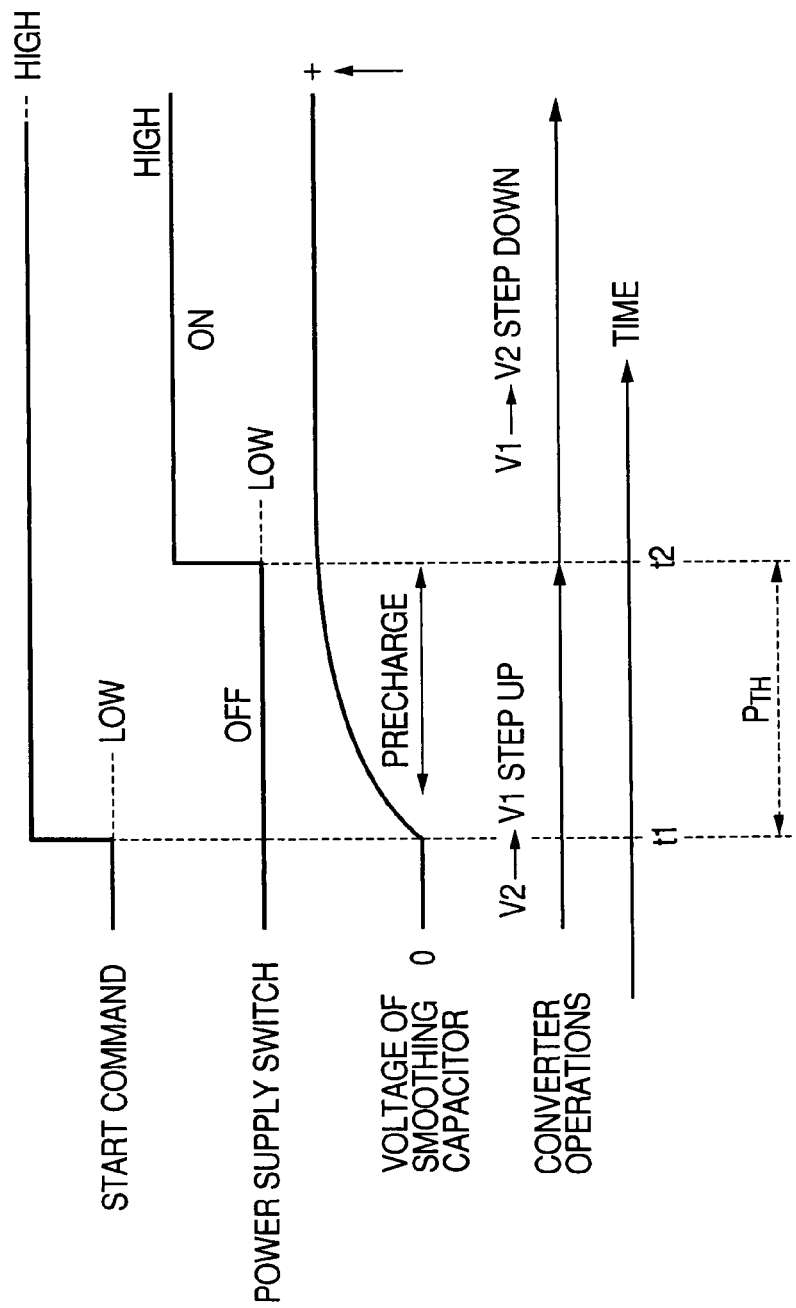
FIG. 15 is a timing chart illustrating operating timings of the DC to DC converter shown in FIG. 14 according to the sixth embodiment of the present invention.

A DC to DC converter according to a sixth embodiment of the present invention will be described in accordance with FIGS. 14 to 16. This sixth embodiment is a modification of the DC to DC converter 1B illustrated in FIG. 11. FIG. 14 is a circuit diagram illustrating a circuit structure of a DC to DC converter 1D according to the sixth embodiment of the present invention. FIG. 15 is a timing chart for operations according to the sixth embodiment.

In the sixth embodiment, for example, the DC to DC converter 1D is installed in an electric vehicle.

As shown in FIG. 14, the DC to DC converter 1D is connected to a low-voltage battery 131 as the second voltage system 2050 in place of the load 3 in FIG. 1, a power supply switch 132, a high-voltage battery 133, and an inverter 134. The power supply switch 132, the high-voltage battery 133, and the inverter 134 are collectively referred to as the first voltage system 1050 and are substituted as the input DC power supply 2.

The power supply switch 132, such as a relay, is connected to the positive terminal of the high-voltage battery 133 in series, and connected to the controller 4. The controller 4 is operative to control to turn on and off the power supply switch 132. That is, when the power supply switch 132 is turned on, power is supplied from the high-voltage battery 133 to the first converting circuit 11. The inverter 134 is a three-phase inverter connected to a high-voltage three-phase AC motor 135 that generates power for traction. The inverter 134 has a pair of DC input terminals 134a and 134b between which a smoothing capacitor Cin is connected. The controller 4 is communicably coupled to a plurality of electronic control units (ECUs), such as a body ECU for controlling drive units to drive the body electronics in the vehicle, such as to lock and unlock the doors and to raise and lower the door windows.

Next, operations of the DC to DC converter 1D will be explained according to the timing chart shown in FIG. 15 and the flowchart shown in FIG. 16.

While the DC to DC converter 1D is in shutdown so that the power supply switch 132 is off state, the controller 4 executes the following processes based on the program previously loaded therein.

Figure 16:
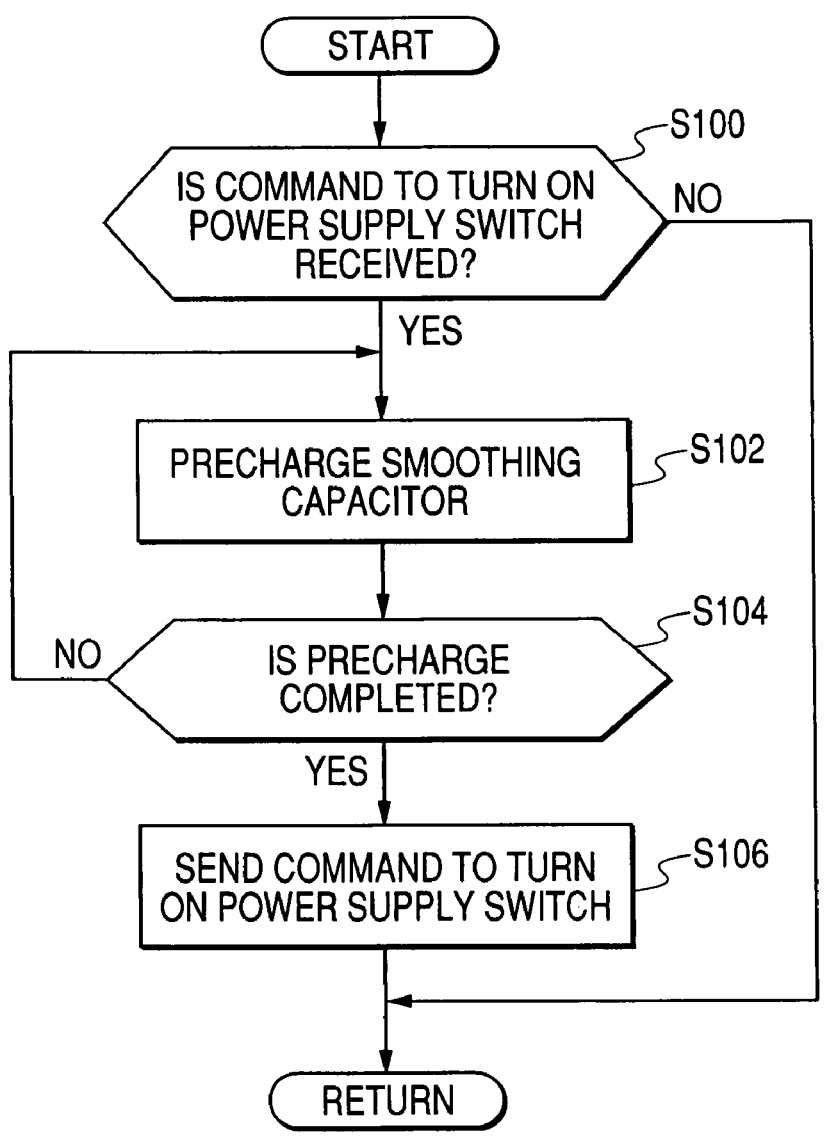
FIG. 16 is a flowchart illustrating processes executed by a controller shown in FIG. 14 according to the sixth embodiment of the present invention.

That is, the controller 4 determines whether a command to turn on the power supply switch 132 for starting the DC to DC converter 1D is received (step S100 in FIG. 16).

When determining that the command is not received (the determination in step S100 is NO), the controller 4 periodically executes the process in step S100.

When determining that the command is received (the determination in step S100 is YES and the start command is turned on in FIG. 15 at time t1), the controller 4 starts the operation of the DC to DC converter 1D to precharge the smoothing capacitor Cin. In particular, as the precharging process, the controller 4 controls the on duty ratio of the first switching element Q1 to gradually reduce it from a predetermined value (percents) (step S102).

In the DC to DC converter 1D, the secondary voltage generated in the second secondary winding W6 is increased with the increase of the on duty ratio of the first switching element Q1, resulting in the increase of the output current (io) from the low voltage battery 131 as the second voltage system 2050.

In contrast, the secondary voltage generated in the second secondary winding W6 is reduced with the decrease of the on duty ratio of the first switching element Q1, resulting in the decrease of the output current (io) to the low voltage battery 131 as the second voltage system 2050.

Furthermore, increasing or reducing the on duty ratio of the first switching element Q1 causes the secondary voltage generated in the second secondary winding W6 to decrease or increase, resulting that power is controlled to be supplied from the low voltage battery 131 (second voltage system 2050) through the DC to DC converter 1D to the first voltage system 1050.

That is, while the power supply switch is off state, the on duty ratio of the first switching element Q1 is gradually reduced so that the voltage applied to the smoothing capacitor Cin from the first converting circuit 11 gradually increases, thereby precharging the smoothing capacitor Cin.

At that time, the controller 4 determines whether a predetermined period Pth has elapsed from the time t1 to determine whether the precharge to the smoothing capacitor Cin is completed (step S104). The predetermined period has previously been set to the period enough to meet the predetermined amount of the electric energy stored in the smoothing capacitor Cin. The predetermined amount of the electric energy substantially corresponds to the voltage of the high-voltage battery 133.

When determining that the predetermined period Pth (t2-t1) has elapsed from the time t1 (the determination in step S104 is YES), the controller 4 determines that the predetermined amount of the electric energy substantially corresponds to the voltage of the high-voltage battery 133 is precharged in the smoothing capacitor Cin. Then, the controller 4 sends the command to the power supply switch 132 to turn it on (step S106).

As a result, because the potential of the smoothing capacitor Cin is substantially identical with that of the high-voltage battery 133, the voltage of the high-voltage battery 133 is applied to the first converting circuit 11. The applied voltage is transferred from the first converting circuit 11 through the first and second transformer assemblies T1 and T2 to the high-voltage battery 133.

That is, the DC to DC converter 1D according to the sixth embodiment prevents inrush current from flowing into the smoothing capacitor Cin in the inverter 134 at the turning-on of the power supply switch 132.

The precharge operation to the smoothing capacitor Cin may be utilized when driving the AC motor 135 with the power supply switch 132 being off state. That is, it may be preferable to execute the above processes whenever turning on the power supply switch 132. This makes it possible to prevent inrush current from flowing into the smoothing capacitor Cin in the inverter 134 whenever turning on the power supply switch 132, thereby protecting the smoothing capacitor Cin and the power supply system in the inverter 1050.

Incidentally, these processes shown in FIG. 16 are performed by the programmed logic circuit, such as the controller 4, but they may be performed by at least one of hard-wired logic circuits in place of the controller 4.

Seventh Embodiment

A DC to DC converter according to a seventh embodiment of the present invention will be described in accordance with FIGS. 17 to 20.

In a case where the input voltage from the first voltage system 1050 to the first converting circuit 11 increases rapidly in the DC to DC converter 1B shown in FIG. 11, the feedback control of the controller 4 may not keep up with the rapid increase of the input voltage. This may cause excess voltage to be applied to the first switching element Q1 and so on.

Thus, the DC to DC converter according to the seventh embodiment aims to prevent, in the DC to DC converter 1B, excess voltage from being applied to the first switching element Q1 and so on even if the input voltage from the first voltage system 1050 to the first converting circuit 11 rapidly increases.

That is, in the DC to DC converter 1B, when the output voltage from the rectifying circuit 400 is higher than the predetermined target voltage while the input voltage is transferred from the power supply 2 (first voltage system 1050), the controller 500 decreases the on duty ratio of the first switching element Q1 (see the process S4 in FIG. 11).

On the other hand, when the output voltage from the rectifying circuit 400 is smaller than the predetermined target voltage, the controller 500 increases the on duty ratio of the first switching element Q1 (see the process S3 in FIG. 11).

These feed back controls of the controller 500 allow the power to be transferred between the first voltage system 1050 and the second voltage system 2050 while the output voltage of the power supply 3 converges to the target voltage even if the input voltage of the first voltage system 1050 increases.

In these processes, however, if the input voltage of the first voltage system 1050, which is inputted to first converting circuit 11 in the DC to DC converter 1B, rapidly changes, the feedback controls may not keep up with the rapidly change of the input voltage.

It is noted that, in the DC to DC converter 1, the source-drain voltage Vds (voltage between the first and second terminals) of the first switching element Q1 is substantially represented as the following equation:

$$Vds = Vin/(1-D)$$

Where Vin represents the input voltage supplied from the first voltage system 1050 and inputted to the first converting circuit 11, and D represents the on duty ratio of the first switching element Q1.

This relationship derives the following conclusion that the maximum value of the source-drain voltage Vds of the first switching element Q1, referred to as "Vdsmax" does not exceed the value represented as "Vin/(1−Dmax)". The Dmax represents the value of the on duty ratio D of the first switching element Q1 when the source-drain voltage Vds becomes the "Vdsmax". The Dmax is referred to as "maximum on duty ratio Dmax"

Thus, reducing the maximum on duty ratio Dmax of the on duty ratio D of the first switching element Q1 with the increase of the input voltage Vin can prevent the maximum value Vdsmax of the source-drain voltage Vds from exceeding the breakdown voltage Vdsth.

The processes for preventing the source-drain voltage Vds of the first switching element Q1 from exceeding the breakdown voltage Vdsth thereof are executed by the controller 500.

That is, the controller 500 has a memory in which table data indicating a relationship between each value of input voltage Vin and the maximum on duty ratio Dmax is previously stored. In addition, in the memory, the program corresponding to the processes is previously loaded.

That is, the controller 500, in accordance with the program, reads the current value of the input voltage Vin (step S200 in FIG. 17), and searches the table data to extract the maximum ratio Dmax corresponding to the current value of the input voltage Vin (step S202).

Subsequently, the controller 500 reads the command for setting the on duty ratio D determined by the feedback processes shown as processes S1 to S2 (step S204).

Thus, the controller 500 determines whether the current on duty ratio D is higher than the maximum on duty ratio Dmax (step S206).

When determining that the current on duty ratio D is higher than the maximum on duty ratio Dmax, the controller 500 sets the current on duty ratio to the maximum on duty ratio Dmax, outputting the set on duty ratio Dmax to each of the first and second converting circuits 11 and 21.

When determining that the current on duty ratio D is not higher than the maximum on duty ratio Dmax, the controller 500 outputs the current on duty ratio D to each of the first and second converting circuits 11 and 21 (step S210).

Figure 18:
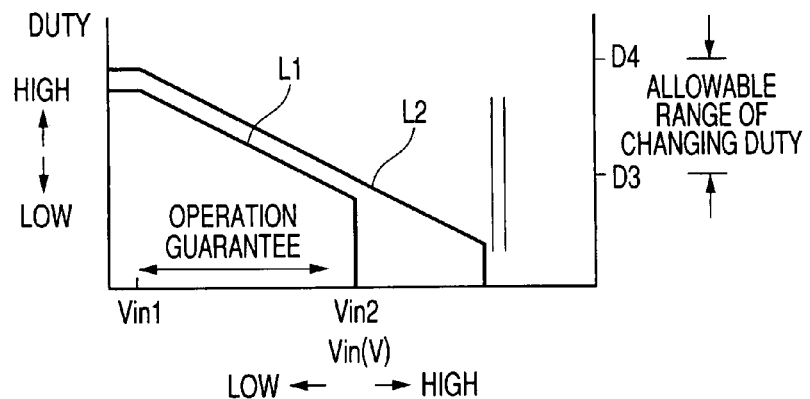
FIG. 18 is a graph illustrating a relationship between a maximum on duty ratio and an input voltage of a DC to DC converter according to the seventh embodiment of the present invention.

The relationship between the input voltage Vin and the maximum on duty ratio Dmax is represented as the line L1 in the graph of FIG. 18. The line L2 illustrated in FIG. 18 represents the maximum of the duty ratio to keep the voltage across the first switching element Q1 less than the breakdown voltage Vdsth with respect to the input voltage Vin. Incidentally, the range between the values Vin1 and Vin2 in the input voltage Vin represents the operation guarantee range of the first switching element Q1. Moreover, the range between the values D3 and D4 in the on duty ratio D represents the allowable range of changing the on duty ratio D of the first switching element Q1.

This configuration prevents the first switching element Q1 from being breakdown even if the input voltage rapidly increases.

Figure 17:
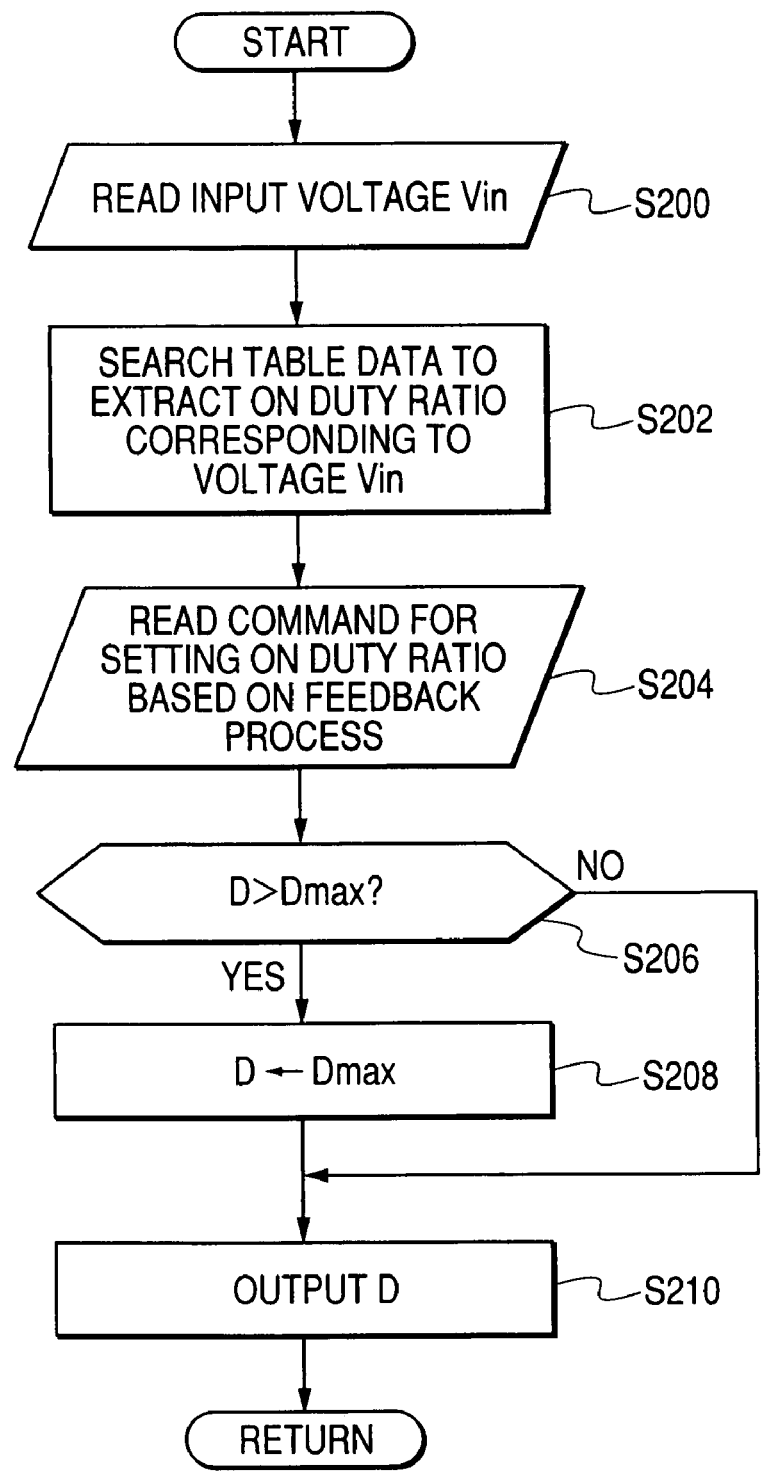
FIG. 17 is a flowchart illustrating processes executed by a controller of a DC to DC converter according to a seventh embodiment of the present invention.

The PWM command including on duty ratio required for the PWM control, which is determined by the controller 500 or by an exterior control unit, is limited by the processes of the controller 500 shown in FIG. 17. The limited PWM command is outputted through the drivers 600 and 700 to the primary circuit 300 (the first converting circuit 11) and the secondary circuit 400 (the synchronous rectifying circuit 21), respectively.

The PWM command causes each of the switching elements Q1 to Q4 to be driven.

It is desirable for the controller 500 to execute the processes shown in FIG. 17 as fast as possible, and as frequently as possible.

In addition, these processes shown in FIG. 17 are performed by the programmed logic circuit, such as the controller 500, but they may be performed by at least one of hard-wired logic circuits in place of the controller 500.

Figure 19:
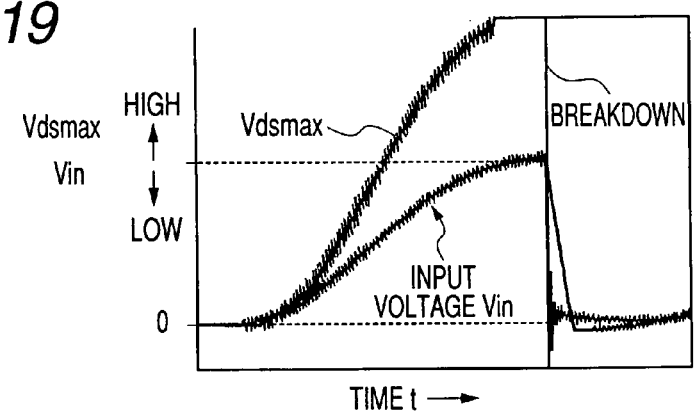
FIG. 19 is a graph showing an example of a waveform of a maximum value of a voltage Vds across the first switching element with respect to the input voltage when the maximum on duty ratio is not limited according to the input voltage related to the seventh embodiment of the present invention.

FIG. 19 is a graph showing an example of the waveform of the maximum value Vdsmax of the voltage Vds with respect to the input voltage Vin when the maximum on duty ratio Dmax is not limited according to the input voltage Vin.

Figure 20:
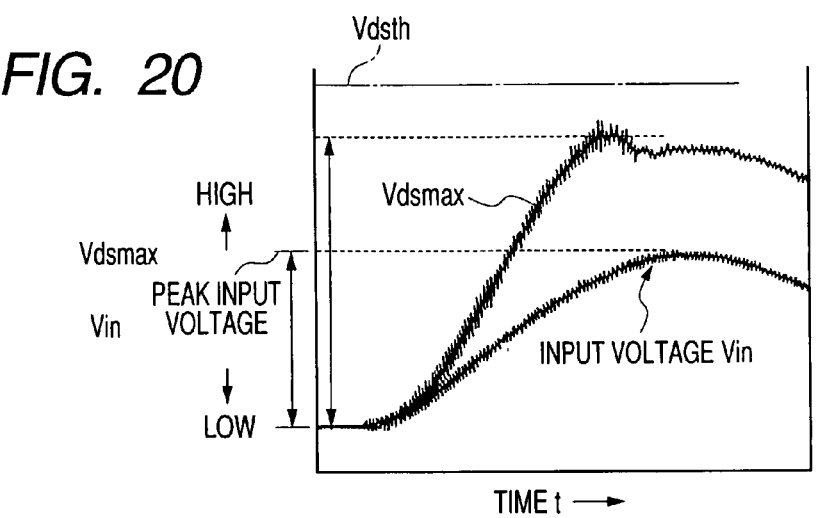
FIG. 20 is a graph showing an example of the waveform of the maximum value of a voltage Vds across the first switching element with respect to the input voltage when the maximum on duty ratio is limited according to the input voltage based on processes shown in FIG. 17 related to the seventh embodiment of the present invention.

FIG. 20 is a graph showing an example of the waveform of the maximum value Vdsmax of the voltage Vds with respect to the input voltage Vin when the maximum on duty ratio Dmax is limited according to the input voltage Vin based on the processes shown in FIG. 17.

As shown in FIG. 20, the maximum value Vdsmax in the drain-source voltage Vds is kept to be lower than the breakdown voltage Vdsth even if the input voltage Vin rapidly increases to reach the peak input voltage.

Eighth Embodiment

A DC to DC converter according to an eighth embodiment of the present invention will be described in accordance with FIGS. 21 to 24.

Figure 21:
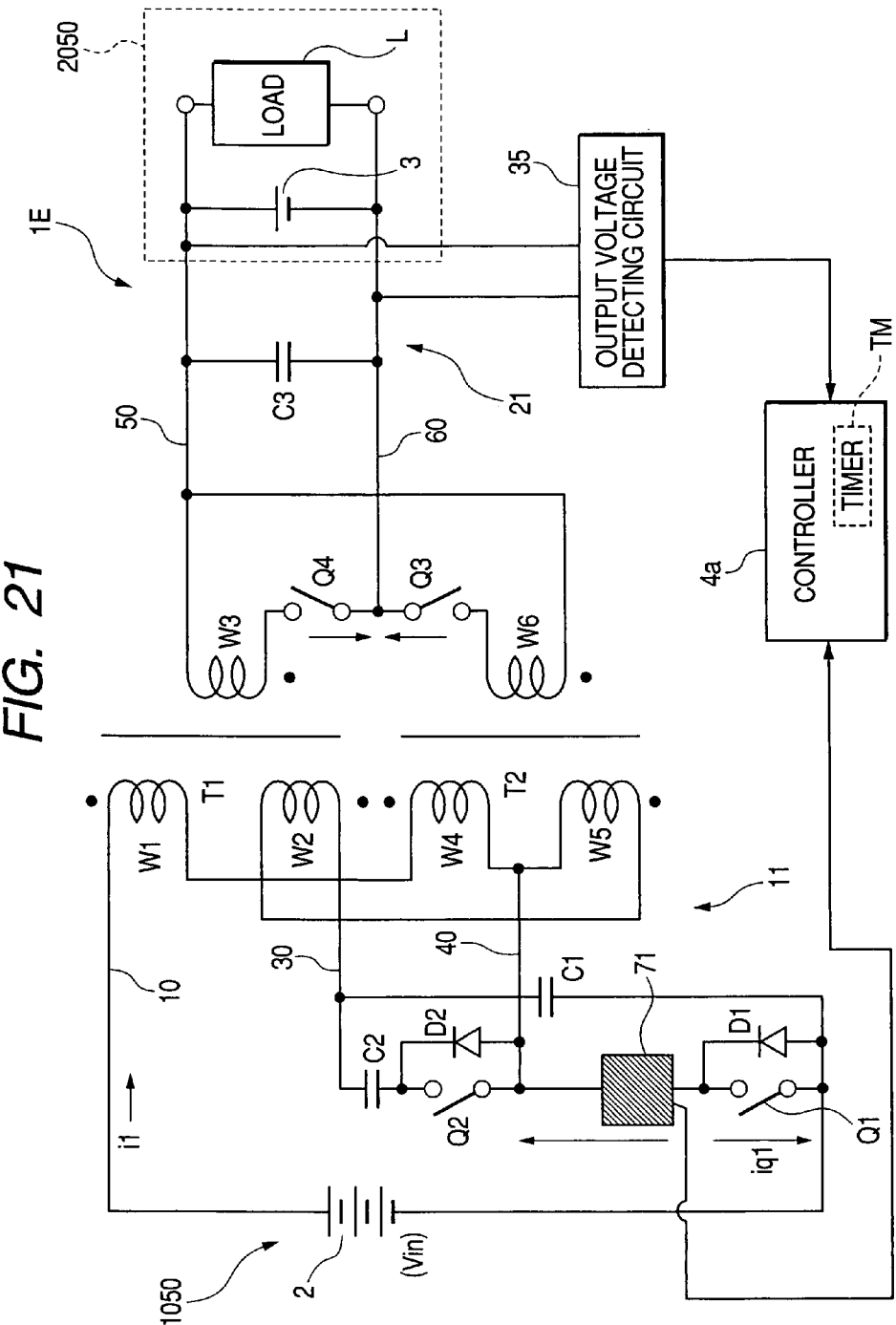
FIG. 21 is a circuit diagram illustrating a circuit structure of a DC to DC converter according to an eighth embodiment of the present invention.

FIG. 21 is a circuit diagram illustrating a circuit structure of a DC to DC converter 1E according to the eighth embodiment of the present invention.

In the eighth embodiment, the DC to DC converter 1E is further provided with a current sensor 71 connected to the switching element Q1 in series. The current sensor 71 is operative to detect a current iq1 flowing through the first switching element Q1 and the current sensor 71 in addition to the structure of the DC to DC converter 1 illustrated in FIG. 1. Incidentally, in FIG. 21, reference character 3 represents a low-voltage battery and a load L is connected to the low-voltage battery 3, which constitute the second voltage system 2050.

As the current sensor 71, various types of well-known current sensors may be applied, such as current transformer (CT), which is especially preferable to allow the current flowing through the switching element Q1 to be detected independently from the primary side of the CT, that is, the first converting circuit 11. Incidentally, the eighth embodiment has been created out of the background as follows.

It is noted that, in a synchronous rectifying circuit, when the load current becomes to be zero or substantially zero, the voltage induced in the first and second secondary windings W3 and W6 is substantially identical with the voltage in the battery in the second voltage system 2050.

This state may make easy to reversely transfer power from the second voltage system 2050 to the first voltage system 1050 in a case where bidirectional MOS transistors are used as the switching element Q3 and Q4. The power transfer from the second voltage system 2050 to the first voltage system may deviate from the object of the DC to DC converter 1E for transferring the first voltage system 1050 to the second voltage system 2050. In order to avoid the reverse power transfer, interrupting the synchronous rectifying operations may be required under the condition that the secondary current is very small. The interrupting of the synchronous rectifying operation may be preferable for reducing drive loss.

One way for determining whether to interrupt the synchronous rectifying operation may be considered to detect the output current from the synchronous rectifying circuit, thereby determining whether to execute the interrupt of the synchronous rectifying operation based on the detected output current. This way may require a resistor for detecting the output current. In a case where the DC to DC converter is served as a step down converter, it is required to extremely reduce the resistance of the resistor. It may be difficult to manufacture the resistor for detecting current having an extremely low resistance with high accuracy, In addition, it may be preferable to interrupt the synchronous rectifying operation when the amount of the load current is sufficiently small. For this purpose, another way is considered to detect the reversed current through the switching elements Q3 and Q4 to interrupt the synchronous rectifying operation according to the detected result. This way may allow the reversed current to flow through the switching elements Q3 and Q4, and the reversed current may have undesirable effects on the load as the second voltage system 2050.

Thus, the eighth embodiment has a feature of controlling the synchronous rectifying operations of the converting circuit 21 according to the detected current by the current sensor 71.

That is, the control operations of the DC to DC converter 1E will be explained according to the flowchart shown in FIG. 22.

Figure 22:
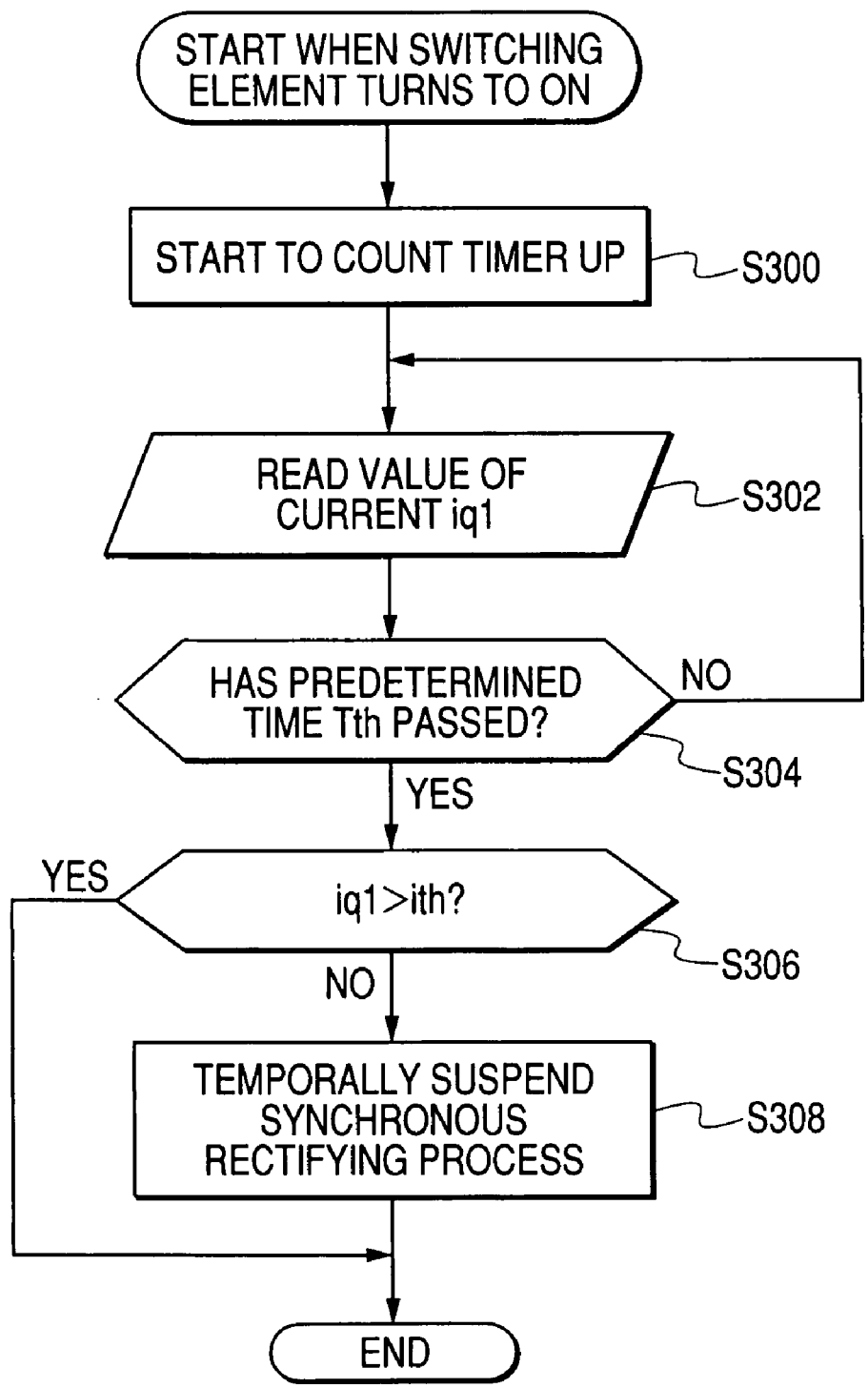
FIG. 22 is a flowchart illustrating processes executed by a controller of the DC to DC converter illustrated in FIG. 21 according to the eighth embodiment of the present invention.

When the operation command Vgq1 to turn on the first switching element Q1, such as the gate voltage, turns to high level in the PWM control processes according to the main program, the controller 4a, according to the subroutine included in the main program, starts to count an integral timer TM up from zero (step S300 in FIG. 22). Next, the controller 4a reads the value of current iq1 flowing through the first switching element Q1 from the current sensor 71 (step S302).

The controller 4a determines whether the count value of the timer TM reaches to a predetermined value, which corresponds to a predetermined threshold time Tth since the count process starts in step S302 (step S304).

When determining that the current count value of the timer TM does not reach the predetermined value, the controller 4a determines that the predetermined threshold time Tth have not passed yet since the start of the count process in step S302 (the determination in step S304 is NO), continuing the process in step S302 and repeating the processes in S302 and S304.

When determining that the current count value of the timer TM reaches the predetermined value (the determination in step S304 is YES), the controller 4a determines that the predetermined threshold time Tth has passed since the start of the count process in step S302.

Thus, the controller 4a determines whether the currently detected value of the current iq1 in the forward direction is larger than a predetermined threshold value ith of current in step S306.

When determining that the currently detected value of the current iq1 in the forward direction is larger than the predetermined threshold value ith, the controller 4a determines that no reverse current occurs in the synchronous rectifying circuit (second converting circuit) 21, terminating the processes. That is, the controller 4a permits the synchronous rectifying operation.

When determining that the currently detected value of the current iq1 in the forward direction is less than the predetermined threshold value ith, the controller 4a determines that there is a possibility that the reverse current occurs in the synchronous rectifying circuit 21. Thus, the controller 4a turns off the third and fourth switching elements Q3 and Q4, thereby temporally suspending the synchronous rectifying processes in step S308.

It may be preferable to adopt the predetermined threshold value ith of current that is larger in the forward direction by a predetermined value than the zero level of the first switching element Q1. This adoption may be determined on condition that load current components of the first switching element Q1, that is, excessive current components reversely flowing through the switching element Q1, are generated due to loses of energy in the transformer assemblies even if the load current outputted from the second converting circuit 21 to the second voltage system 2050.

It may be preferable to set the threshold time Tth to time until the detected value of the current iq1 through the first switching element Q1 at the no load reaches the threshold value ith.

As a modification of the eighth embodiment, the controller 4a may suspend the operations of the first converting circuit 11 for a predetermined period simultaneously while keeping the interrupt of the synchronous rectification.

In the above eighth embodiment, the controller 4a determines whether the currently detected value of the current iq1 in the forward direction is larger than the predetermined threshold value ith, thereby determining the likelihood that the reverse current occurs in the synchronous rectifying circuit 21 (see the processes shown in FIG. 22).

Figure 23:
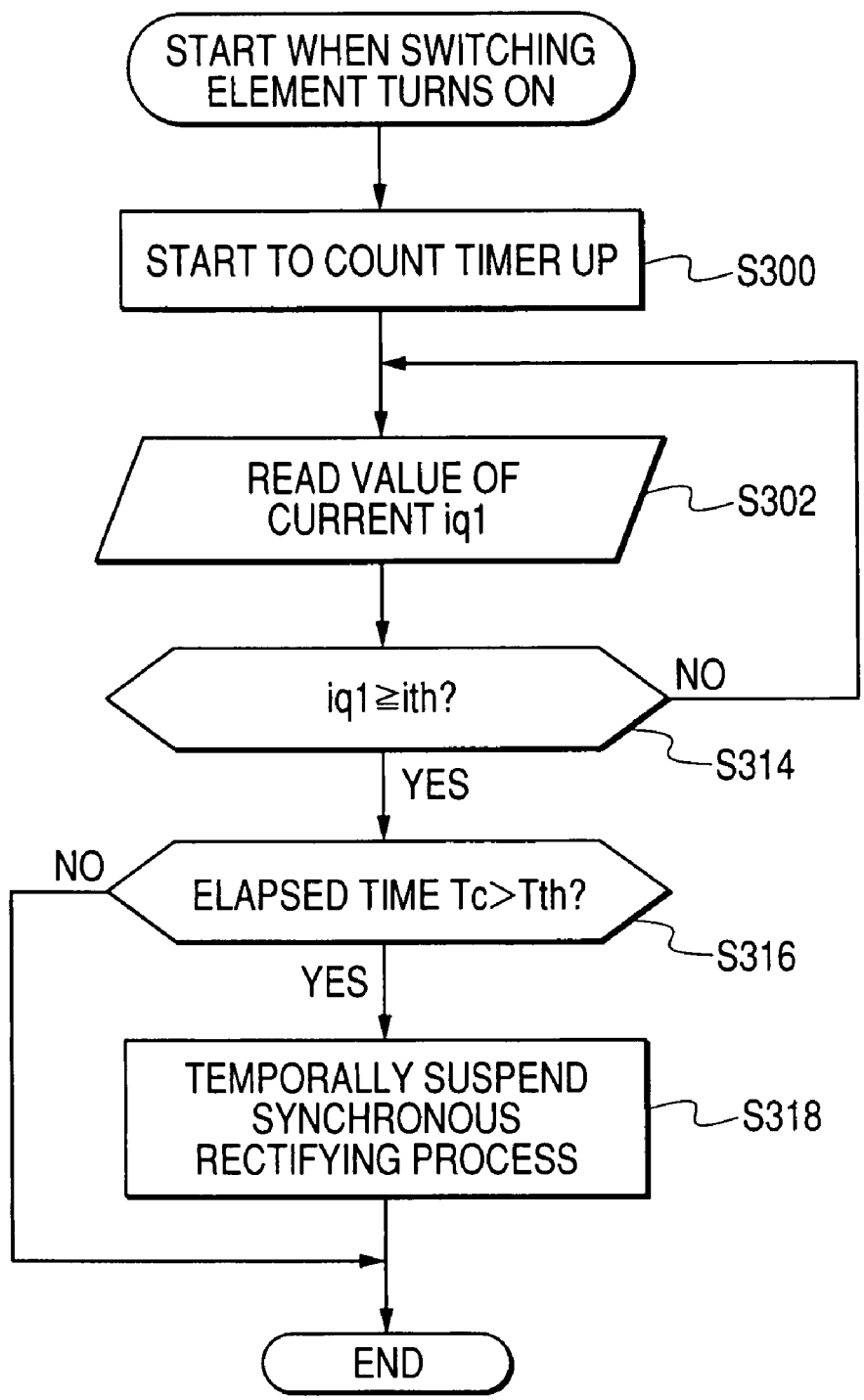
FIG. 23 is a flowchart illustrating processes executed by the controller of the DC to DC converter illustrated in FIG. 21 according to another modification of the eighth embodiment of the present invention.

As another modification of the eighth embodiment, the controller 4a executes processes shown in FIG. 23, which are partially changed in the processes shown in FIG. 22.

That is, when the operation command Vgq1 to turn on the first switching element Q1 turns to high level in the PWM control processes according to the main program, the controller 4a, according to the subroutine included in the main program, starts to count an integral timer TM up from zero (step S300 in FIG. 23). Next, the controller 4a reads the value of current iq1 flowing through the first switching element Q1 from the current sensor 71 (step S302).

The controller 4a determines whether the currently detected value of the current iq1 in the forward direction reaches the predetermined threshold value ith of current in step S314.

When determining that the currently detected value of the current iq1 in the forward direction is less than the predetermined threshold value ith, the controller 4a continues to the process in step S302 and repeats the processes S302 and 314.

When determining that the currently detected value of the current iq1 in the forward direction reaches to the predetermined threshold value ith, that is, the currently detected value is not less than the predetermined threshold value ith (the determination in step S314 is YES), the controller 4a shifts to the process in next step S316.

That is, the controller 4a stops to count the integral timer TM, and compares the currently count value at the stop, that is, elapsed time Tc since the first switching element Q1 is turned on, with the predetermined threshold time Tth in step S316.

When the elapsed time Tc from the turning on of the first switching element Q1 is not more than the predetermined threshold time Tth, the controller 4a determines that no reverse current occurs in the synchronous rectifying circuit (second converting circuit) 21, terminating the processes.

When the elapsed time Tc from the turning on of the first switching element Q1 is less than the predetermined threshold time Tth, the controller 4 determines that there is a possibility that the reverse current occurs in the synchronous rectifying circuit 21. Thus, the controller 4 turns off the third and fourth switching elements Q3 and Q4, thereby temporally suspending the synchronous rectifying processes in step S318.

These processes shown in FIG. 22 or 23 are performed by the programmed logic circuit, such as the controller 4a, but they may be performed by at least one of hard-wired logic circuits in place of the controller 4a.

Figure 24:
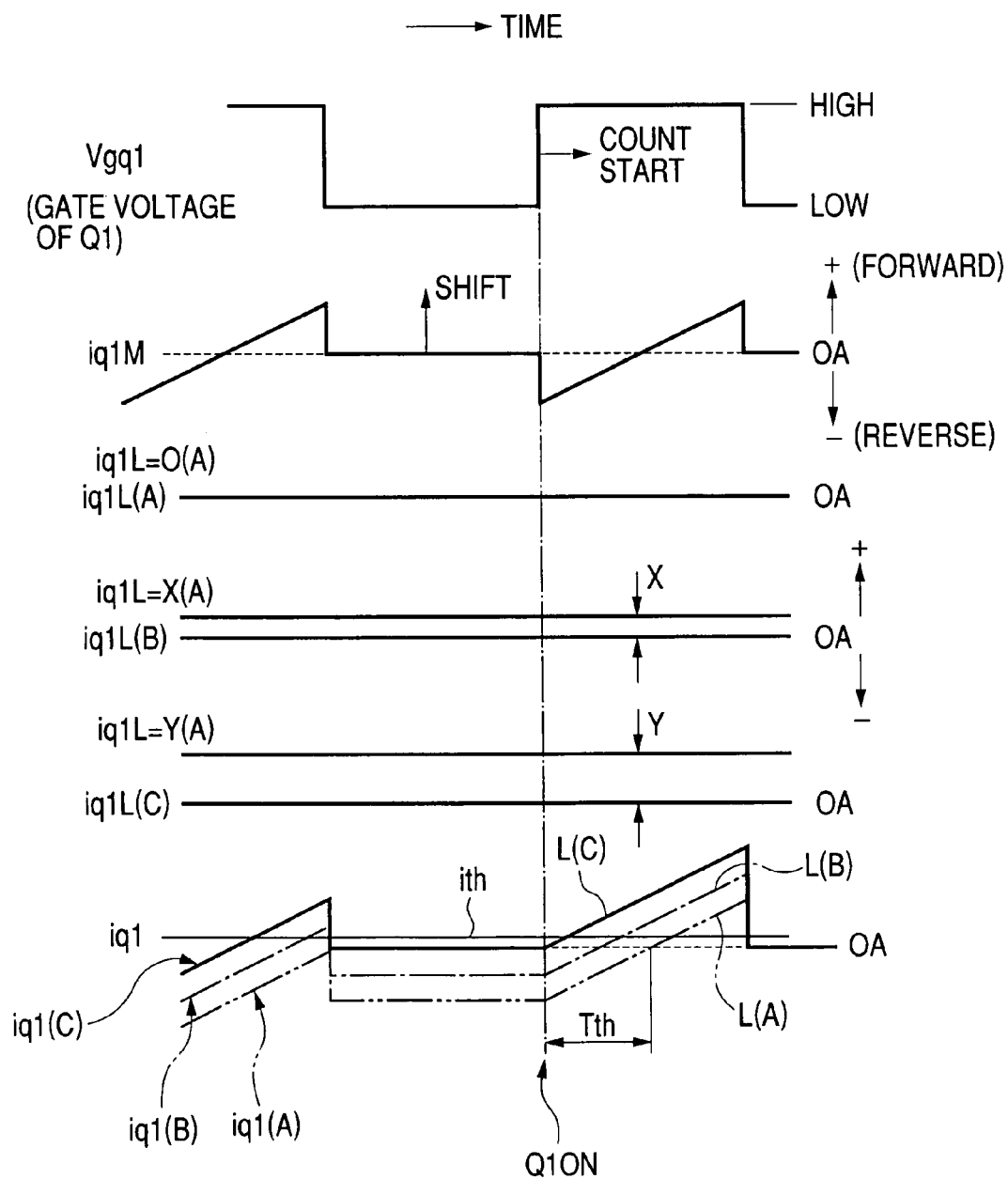
FIG. 24 is a waveform chart showing waveforms of a current flowing through the first switching element according to the eighth embodiments and their modifications of the present invention.

The reason why these processes explained in the eighth embodiment and the modifications thereof determine whether there is a possibility that the reverse current occurs in the synchronous rectifying circuit 21 according to FIG. 24.

FIG. 24 shows waveforms of the current iq1 flowing through the first switching element Q1 with respect to the load currents having various magnitudes, respectively, and waveforms of the gate voltage of the first switching element Q1.

In FIG. 24, the current component iq1M in the current iq1 is a magnetizing current component, which is AC component, and a load current component iq1L, which is DC component, whose value is varied depending on the load. Incidentally, the magnetizing current component of the current component iq1M in the current iq1 represents a current component that flows through the primary windings at no load.

The sum of the magnetizing current component iq1M and the load current component iq1L becomes the current iq1 flowing through the first switching element Q1.

As compared that the magnetizing inductances of the windings W2 and W5 work in the direction when the first switching element Q1 is on state, when the first switching element Q1 is off state at no load, the magnetizing inductances of the primary windings W2 and W5 work in the reversed direction (see FIGS. 7 and 8).

The magnetizing inductances cause, when the first switching element Q1 is turned on, the magnetizing current component iq1M to flow in the reversed direction with respect to the arrow iq1 illustrated in FIG. 21 (see the waveform of the iq1M in FIG. 24). After that, the reversed current component of the iq1M is attenuated for a while so that the magnetizing current iq1M becomes zero at the midpoint of the on time of the first switching element Q1. After that, the magnetizing current component iq1M flows in the forward direction (the arrow iq1) with the magnitude increasing. That is, the forward component and the revered component of the magnetizing current component iq1M are averagely zero within the on time of the first switching element Q1 (see the waveform of the iq1M in FIG. 24).

When the load current increases, the waveform of the magnetizing current component iq1M is biased by the magnitude of the load current component iq1L to shift in the forward direction.

If, therefore, the load current component iq1L is zero (ampere) (as iqiL(A) in FIG. 24), the waveform of the current iq1(A) coincides with the magnetizing current component iq1M, which is represented as double dashed line L(A). If the load current component iq1L is X (ampere) (as iqiL(B) in FIG. 24), the waveform of the current iq1(B) shifts in the forward direction by the biased current X, which is represented as dashed line L(B).

If the load current component iq1L is Y (ampere), which is larger than the magnitude X, (as iq1L(C) in FIG. 24), the waveform of the current iq1 shifts in the forward direction by the biased current Y, which is represented as solid line L(C).

Assuming that the predetermined threshold value ith is set as shown in FIG. 24, therefore, the earlier the timing at which the current iq1 in the forward direction is higher than the threshold value ith is, the larger the magnitude of the load current is. In contrast, the later the timing at which the current iq1 in the forward direction is higher than the threshold value ith is, the smaller the magnitude of the load current is.

For example, because the current iq1(C) most quickly exceeds the threshold value ith than the other currents iq1(B) and iqi1(A), the magnitude of the load current component iq1L(C) is largest in the load current components iq1L(A) to iqi1L(C).

That is, it is noted that the magnitude of the load current at the turning on of the first switching element Q1 represents that there is a possibility that the reversed current occurs in the synchronous rectifying circuit 21.

That is, determining whether the currently detected value of the current iq1 in the forward direction is larger than the predetermined threshold value ith allows the possibility that the magnitude of the load current immediately at the turning on of the first switching element Q1 generates the reversed current in the synchronous rectifying circuit 21 to be determined.

Incidentally, if the threshold value ith is set to negative value, it is possible to obtain the magnitude of the load current immediately after the turning on of the first switching element Q1, in other words the possibility that reversed current occurs in the synchronous rectifying circuit 21.

When executing the above "soft switching" of the first switching element Q1, the LC circuit having the leakage inductance and the output capacitance causes the current passing through the first switching element Q1 to flow in the reversed direction.

In order to avoid the effect of the "soft switching", as the eighth embodiment and the modifications thereof, it is preferable to determine whether the predetermined threshold time Tth has passed since the start of the turning on of the first switching element Q1.

In this case, only when the predetermined threshold time Tth has passed since the start of the turning on of the first switching element Q1, and when the currently detected value of the current iq1 in the forward direction is larger than the predetermined threshold value ith, it is possible to determine that the reversed current occurs in the synchronous rectifying circuit 21. This makes it possible to accurately determine whether the reversed current occurs in the synchronous rectifying circuit 21 independently of the "soft switching" processes.

Ninth Embodiment

A DC to DC converter according to a ninth embodiment of the present invention will be described in accordance with FIGS. 25 and 26.

The DC to DC converter according to the ninth embodiment adopts a specific structure of the first transformer assembly T1 and the second transformer assembly T2. Other structures of the DC to DC converters are substantially identical with those of the DC to DC converter 1 shown in FIG. 1 so that the explanations of the other structures are omitted.

Figure 25:
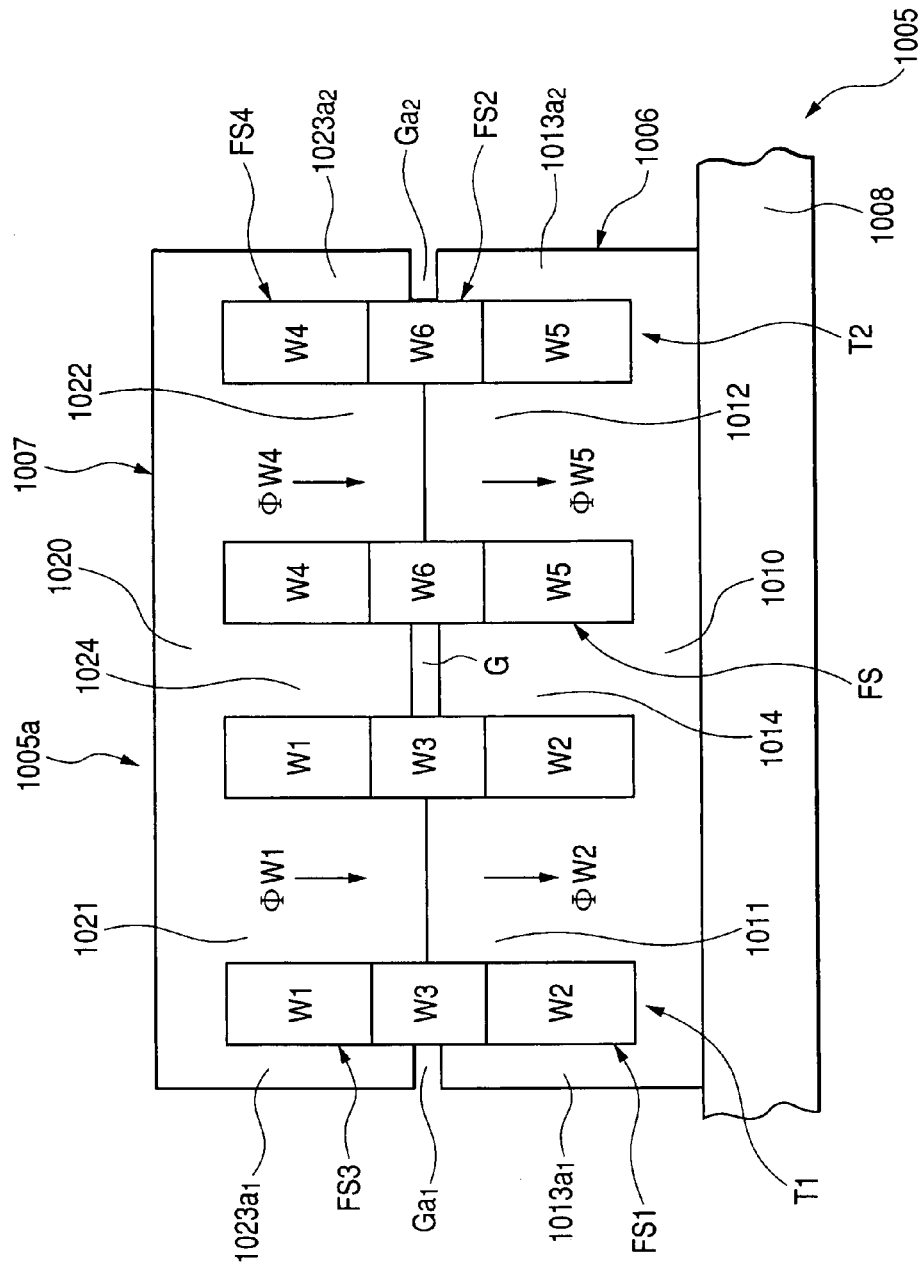
FIG. 25 is a schematic structural view illustrating a structure of an integrated transformer assembly according to a ninth embodiment of the present invention.
Figure 26:
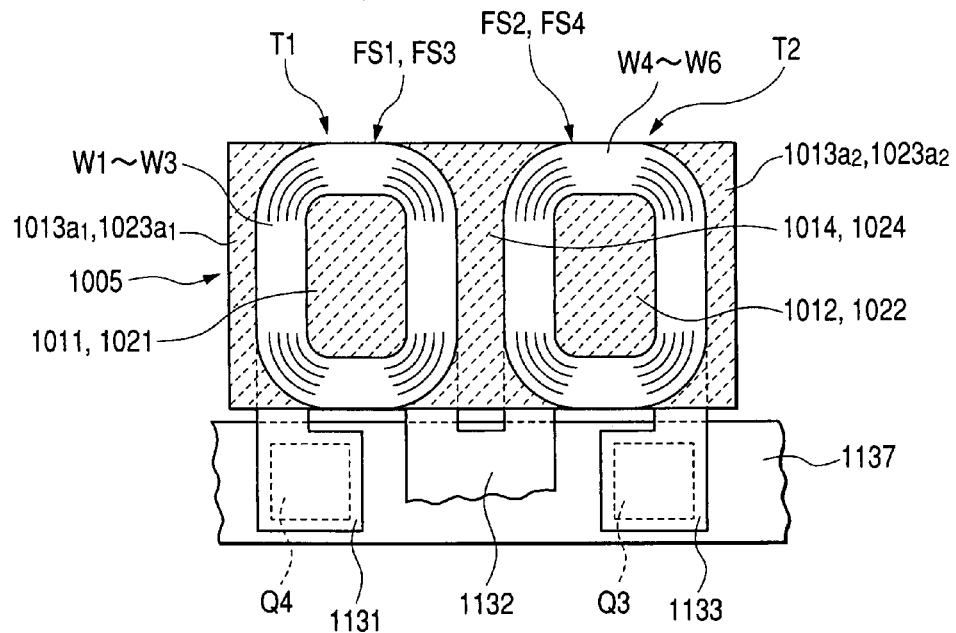
FIG. 26 is a schematic cross sectional view of the integrated transformer assembly along winding directions of windings shown in FIG. 25 according to the ninth embodiment of the present invention.

As shown in FIGS. 25 and 26, the first and second transformer assemblies T1 and T2 are integrated with each other to form an integrated transformer assembly 1005.

The integrated transformer assembly 1005 is provided with a core assembly (core body) 1005a composed of slotted core members 1006 and 1007. Each of the slotted core members 1006 and 1007 is made of a ferrite-molded part. The first and second primary windings W1 and W2, the third and fourth primary windings W4 and W5, and the first and second secondary windings W3 and W6 are wound in the core assembly 1005a. That is, the slotted core members 1006 and 1007 constitute a first core of the first transformer assembly T1 and a second core of the second transformer assembly T2.

The integrated transformer assembly 1005 is provided with a base plate 1008 made of, for example, aluminum on which the integrated core assembly 1005a is mounted. The base plate 1008 is served as a heat sink and a grounded electrode plate.

The slotted core member 1006 has a base plate member 1010, referred to as a beam member, which is fixedly mounted at its one surface on the base plate 1008.

The slotted core member 1006 has a plurality of, for example, a pair of pole portions 1011 and 1012 each having rectangular rounds or circular shape in its lateral cross section. The pole portions 1011 and 1012 parallely extend from the other surface of the base plate member 1010. The pole portions 1011 and 1012 are aligned along the longitudinal side of the base plate member 1010 apart from each other. The pole portions 1011 and 1012 are disposed to be apart from the lateral sides of the base plate member 1010, respectively.

The extending lengths of the pole portions 1011 and 1012 are the same with each other.

The slotted core member 1006 is also provided with outer wall portions 1013a1 and 1013a2 and parallely extending from the other surfaces of the lateral sides of the base plate member 1010, respectively. The outer wall portions 1013a1 and 1013a2 are disposed to be apart from the pole portions 1011 and 1012, respectively. The outer wall portions 1013a1 and 1013a2 also have inner surfaces opposite to the pole portions 1011 and 1012, respectively.

Each of the inner surfaces of the outer wall portions 1013a1 and 1013a2 has a pair of edges. The paired edges of each of the outer wall portions 1013a1 and 1013a2 are opposite to the round corner portions of the pole portions 1011 and 1012 to be inwardly curved toward the corresponding round corner portions, respectively.

The extending lengths of the wall portions 1013a1 and 1013a2 are the same with each other.

The slotted core member 1006 is provided with an inner partition wall portion 1014 disposed between the pole portions 1011 and 1012 and extending from the other surface of the middle portion of the base plate member 1010.

The partition wall portion 1014 is disposed to be apart from the pole portions 1011 and 1012, respectively. The partition wall portion 1014 also has outer surfaces opposite to the pole portions 1011 and 1012, respectively. Each of the outer surfaces of the partition wall portion 1014 has a pair of edges. The paired edges of each of the outer surfaces of the partition wall portion 1014 are opposite to the round corner portions of the pole portions 1011 and 1012 to be outwardly curved toward the corresponding to the round corner portions, respectively.

A substantially annular path formed by the outer side surface of the pole portion 1011, the inner surface of the outer wall portion 1013a1, and one of the outer surfaces of the partition wall portion 1014 is served as a slot FS1. Similarly, a substantially annular path formed by the outer side surface of the pole portion 1012, the inner surface of the outer wall portion 1013a2, and the other of the outer surfaces of the partition wall portion 1014 is served as a slot FS2.

Similarly, the slotted core member 1007 has a base plate member 1020, referred to as a beam member, which is disposed to be opposite to the base plate member 1010.

The slotted core member 1007 has a plurality of, for example, a pair of pole portions 1021 and 1022 each having rectangular rounds in its lateral cross section or a circular shape in its lateral cross section. The pole portions 1021 and 1022 parallely extend from the base plate member 1020 towards the slotted core member 106. The pole portions 1021 and 1022 are aligned along the longitudinal side of the base plate member 1020 apart from each other so that the pole portions 1021 and 1022 are opposite to the pole portions 1011 and 1012, respectively. The pole portions 1021 and 1022 are disposed to be apart from the lateral sides of the base plate member 1020, respectively.

The extending lengths of the pole portions 1021 and 1022 are the same with each other.

The slotted core member 1007 is also provided with outer wall portions 1023a1 and 1023a2 and parallely extending from the lateral sides of the base plate member 1020, respectively. The outer wall portions 1023a1 and 1023a2 are disposed to be apart from the pole portions 1021 and 1022, respectively, so that the outer wall portions 1023a1 and 1023a2 are opposite to the outer wall portions 1013a1 and 1023a2, respectively. The outer wall portions 1023a1 and 1023a2 also have inner surfaces opposite to the pole portions 1021 and 1022, respectively.

Each of the inner surfaces of the outer wall portions 1023a1 and 1023a2 has a pair of edges. The paired edges of each of the outer wall portions 1023a1 and 1023a2 are opposite to the round corner portions of the pole portions 1021 and 1022 to be inwardly curved toward the corresponding round corner portions, respectively.

The extending lengths of the wall portions 1013a1 and 1013a2 are the same with each other.

The slotted core member 1007 is provided with a partition wall portion 1024 disposed between the pole portions 1021 and 1022 and extending from the middle portion of the base plate member 1020 to be opposite to the partition wall portion 1024.

The partition wall portion 1024 is disposed to be apart from the pole portions 1021 and 1022, respectively. The partition wall portion 1024 also has outer surfaces opposite to the pole portions 1021 and 1022, respectively. Each of the outer surfaces of the partition wall portion 1024 has a pair of edges. The paired edges of each of the outer surfaces of the partition wall portion 1024 are opposite to the round corner portions of the pole portions 1021 and 1022 to be outwardly curved toward the corresponding to the round corner portions, respectively.

A substantially annular path formed by the outer side surface of the pole portion 1021, the inner surface of the outer wall portion 1023a1, and one of the outer surfaces of the partition wall portion 1024 is served as a slot FS3. Similarly, a substantially annular path formed by the outer side surface of the pole portion 1022, the inner surface of the outer wall portion 1023a2, and the other of the outer surfaces of the partition wall portion 1024 is served as a slot FS4.

The extending ends of the pole portions 1011 and 1021 are abut to each other, and the extending ends of the pole portions 1021 and 1022 are abut to each other.

The extending ends of the outer wall portions 1013a1 and 1023a1 are disposed to be opposite to each other at a narrow gap Ga1 therebetween so that the outer wall portions 1013a1 and 1023a1 constitute a common magnetic path corresponding to a non-wound magnetic path.

The extending ends of the outer wall portions 1013a2 and 1023a2 are disposed to be opposite to each other at a narrow gap Ga2 therebetween so that the outer wall portions 1013a2 and 1023a2 constitute a common magnetic path corresponding to a non-wound magnetic path.

In addition, the extending ends of the partition wall portions 1014 and 1024 are disposed to be opposite to each other at a narrow gap G therebetween so that the partition wall portions 1014 and 1024 constitute a common magnetic path corresponding to a non-wound magnetic path.

These gaps Ga1, Ga2, and G are served to avoid magnetic saturation of the core assembly 1005a. In a case where the total of the cross sectional areas of the magnet paths in the core assembly 1005a is sufficiently wide so that the magnetic saturation of the core assembly 1005a is negligible, the gaps Ga1, Ga2, and G may be unnecessarily for the core assembly 1005a. In addition, in a case where a suitable current limiting unit is provided for preventing the generated magnetic flux in the core assembly 1005a from being saturated, the gaps Ga1, Ga2, and G may be unnecessarily for the core assembly 1005a. Another narrow gap may be provided for the pole portions 1011 and 1021 and/or the 1012 and 1022.

The pole portions 1011 and 1012 constitute a first pole assembly corresponding to a wound magnetic path of the first core, and the pole portions 1012 and 1022 constitute a second pole assembly corresponding to a wound magnetic path of the second core.

The outer wall portions 1013a1, 1013a2, 1023a1, and 1023a2 surround the pole portions 1011, 1012, 1021, and 1022 to prevent magnetic noises from leaking to an exterior of the core assembly 1005a.

The first primary winding W1 is wound around the pole portion 1021 to be stored in the slot FS3, and the second primary winding W2 is wound around the pole portion 1011 to be stored in the slot FS1. The first secondary winding W3 is wound around the abutting portion of the pole portions 1011 and 1021 to be stored in the slots FS1, FS3 and the gap Ga1.

Similarly, the third primary winding W4 is wound around the pole portion 1022 to be stored in the slot FS4, and the fourth primary winding W5 is wound around the pole portion 1012 to be stored in the slot FS2. The second secondary winding W6 is wound around the abutting portion of the pole portions 1012 and 1022 to be stored in the slots FS2, FS4 and the gap Ga2.

In the ninth embodiment, the numbers of turns of the windings W1 and W4 are equals to each other, and the numbers of turns of the windings W2 and W5 are equals to each other. The number of turns of each of the windings W3 and W6 is set to 1 turn.

Three terminals 1131, 1132, and 1133 of the first and second secondary windings W3 and W6 are drawn out and project therefrom in one direction. The terminal 1131 is a grounded terminal of the first secondary winding W3, and the terminal 1133 is a grounded terminal of the second secondary winding W6. The terminals 1131 and 1133 are grounded through the third and fourth switching elements Q3 and Q4.

The terminal 1132 is an output terminal of the second converting circuit 21. Each of the switching elements Q3 and Q4, having a substantially card module, is sandwiched between each of the terminals 1131 and 1133 and a copper busbar, in other words, grounded electrode, 1137.

The first and third primary windings W1 and W4 are wound in one direction, and the second and fourth primary windings W2 and W5 are wound in one direction. That is, when causing a current to flow in each of the windings W1 and W4, the magnetic flux generated in the pole portions 1012 and 1022 by the winding W1 is opposite in direction to the magnetic flux generated in the pole portions 1012 and 1022 by the winding W4. The magnetic flux generated in the pole portions 1011 and 1021 by the winding W4 is opposite in direction to the magnetic flux generated in the pole portions 1011 and 1021 by the winding W1.

Similarly, when causing a current to flow in each of the windings W2 and W5, the magnetic flux generated in the pole portions 1012 and 1022 by the winding W2 is opposite in direction to the magnetic flux generated in the pole portions 1012 and 1022 by the winding W5. The magnetic flux generated in the pole portions 1011 and 1021 by the winding W5 is opposite in direction to the magnetic flux generated in the pole portions 1011 and 1021 by the winding W2.

The pole portions 1011 and 1021 constituting the wound magnetic path of the first transformer assembly T1 and the pole portions 1012 and 1022 constituting the wound magnetic path of the second transformer assembly T2 generate magnetic fluxes in the outer wall portions 1013a1, 1023a1, 1013a2, and 1023a2 constituting the non-wound magnetic path in the same direction.

In this case, it may be preferable that the total of the cross sectional areas of the magnet paths in the pole portions 1011, 1021, 1012, and 1022 are substantially equal to the total of the cross sectional areas of the outer wall portions 1013a1, 1023a1, 1013a2, and 1023a2.

As described above, the integrated transformer assembly 1050 according to the ninth embodiment has the common magnetic paths (the partition wall portions 1014 and 1024, and the outer wall portions 1013a1 and 1023a1) between the first and second transformer assemblies T1 and T2, making it possible to downsize the core assembly 1005a, that is, the integrated transformer assembly 1050 itself.

In addition, in the integrated transformer assembly 1050 according to the ninth embodiment, because the core assembly 1005a is composed of the pole portions 1011, 1012, 1021, and 1022 as the wound magnetic path, the inner partition wall portions 1014, 1024, and the outer wall portions 1013a1, 1023a1, 1013a2, and 1023a2, which are the non-wound magnetic paths, it is possible to simple the structure of the core assembly 1005a.

Moreover, in the integrated transformer assembly 1050 according to the ninth embodiment, when causing a current to flow in each of the windings W1 and W4, the magnetic flux generated in the pole portions 1012 and 1022 by the winding W1 is opposite in direction to the magnetic flux generated in the pole portions 1012 and 1022 by the winding W4. This configuration allows the magnetic fluxes based on the windings W1 and W2 not to be interfered with the magnetic fluxes based on the windings W4 and W5.

Furthermore, in the integrated transformer assembly 1050 according to the ninth embodiment, the three terminals 1131, 1132, and 1133 of the first and second secondary windings W3 and W6 are drawn out and project therefrom, it is possible to integrate the first and second secondary windings W3 and W6 with each other, thereby making the size of the integrated transformer assembly 1005 compact.

When the number of turns of each of the windings W3 and W6 is set to 1 turn, it may be preferable that the three terminals 1131, 1132, and 1133 of the first and second secondary windings W3 and W6 are drawn out and project therefrom in one direction because of improving the magnetic coupling between the first and second secondary windings W3 and W6.

Still furthermore, the core assembly 1005a is fixedly mounted on the base plate 1008 that is served as a heat sink and a grounded electrode plate, allowing heating from the core assembly 1005a and that from the windings to be smoothly defused into the base plate 1008, thereby cooling the core assembly 1005a.

In particular, because each of the switching elements Q3 and Q4 is individually sandwiched between each of the terminals 1131 and 1133 and the grounded electrode 1137, it is possible reduce the wiring parasitic inductance and the wiring resistance between each switching element Q3, Q4 and each secondary winding W3, W6, thereby decreasing the switching surge voltage and the wiring loses. In addition, it is possible to dissipate heating from each switching element Q3, Q4 into the base plate 1008.

Tenth Embodiment

A DC to DC converter according to a tenth embodiment of the present invention will be described in accordance with FIGS. 27 and 28.

The DC to DC converter according to the tenth embodiment adopts a specific structure of the first transformer assembly T1 and the second transformer assembly T2. Other structures of the DC to DC converters are substantially identical with those of the DC to DC converter 1 shown in FIG. 1 so that the explanations of the other structures are omitted.

Figure 27:
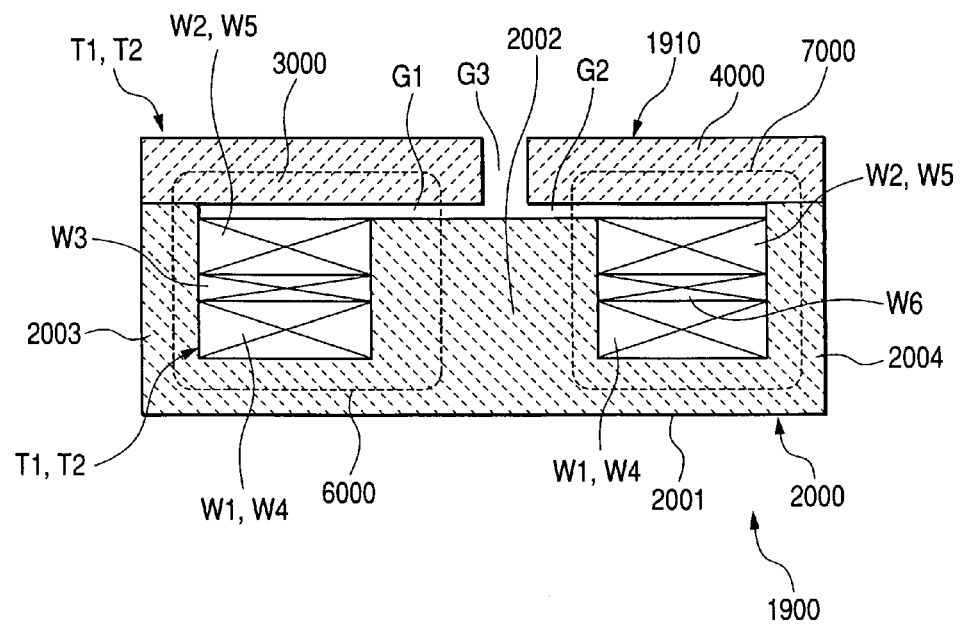
FIG. 27 is a schematic cross sectional view of an integrated transformer assembly along a center axis of each winding thereof according to a tenth embodiment of the present invention.

As shown in FIG. 27, the first and second transformer assemblies T1 and T2 are integrated with each other to form an integrated transformer assembly 1900.

The integrated transformer assembly 1900 is provided with a core assembly 1910 composed of a substantially E shaped core 2000, a first substantially I shaped core 3000, and a second substantially I shaped core 4000.

The E-shaped core 2000 is provided with a base plate 2001, a center pole portion 2002 extending from one surface of the base plate 2001 in orthogonal to the one surface direction of the base plate.

The E-shaped core 2000 is provided with a first side wall portion 2003 extending from one side edge of the base plate 2001 in parallel to the center pole portion 2002, and a second side wall portion 2004 extending from the other side edge of the base plate 2001 in parallel to the center pole portion 2002. The E-shaped core 2000 has a substantially E-shape in its extending direction.

The first I-shaped core 3000 is disposed on upper side of the center pole portion 2002 and the first side wall portion 2003 to be relocatable in the upper surface of the center pole portion 2002. That is, the I-shaped core 3000 is mounted on the first side wall portion 2003 to form a gap G1 between the first I-shaped core 3000 and the center pole portion 2002. This structure provides a first closed magnetic path 6000 with the gap G1 passing through the first I-shaped core 3000, the first side wall portion 2003, the base plate 2001, the center pole portion 2002, and the gap G1.

The second I-shaped core 4000 is disposed on upper side of the center pole portion 2002 and the second side wall portion 2004 to be relocatable in the upper surface of the center pole portion 2002. That is, the I-shape core 4000 is mounted on the second side wall portion 2004 to form a gap G2 between the I-shape core 4000 and the center pole portion 2002. This structure provides a second closed magnetic path 7000 with the gap G2 passing through the second I-shaped core 4000, the second side wall portion 2004, the base plate 2001, the center pole portion 2002, and the gap G2. Incidentally, one of the first and second I-shaped cores 3000 and 4000 may be relocatable in the upper surface of one of the first and second side wall portions 2003 and 2004.

A gap G3 is formed between the first I-shaped core 3000 and the second I-shaped core 4000. The gap G3 is communicated with the gaps G1 and G2 to form a substantially T-shape in a cross section in parallel to the axial direction of the center pole portion 2002.

The first primary winding W1 and the third primary winding W4 are integrated with each other and wound around the center pole portion 2002 by a predetermined number of turns. The second primary winding W2 and the fourth primary winding W5 are integrated with each other and wound around the center pole portion 2002 by a predetermined number of turns.

The secondary winding W3 and W6 are wound around the center pole portion 2002 by half-turn in the reverse directions, respectively.

Figure 28:
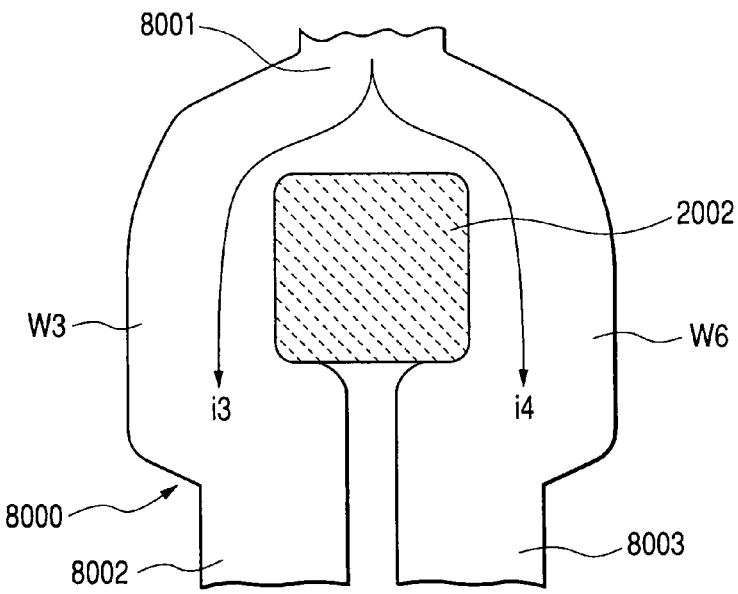
FIG. 28 is a structural view illustrating secondary windings of the integrated transformer assembly according to the tenth embodiment of the present invention.

Each of the windings W3 and W6, as shown in FIG. 28, is made of a coil conductive plate 8000 that is stamped out from single thin copper plate.

The first secondary winding W3 is disposed between the first side wall portion 2003 and the center pole portion 2002, and the second secondary winding W6 is disposed between the first side wall portion 2003 and the center pole portion 2002. One-end portions 8001 of the secondary windings W3 and W6 are formed together, and the other end portion 8002 of the winding W3 and the other end portion 8003 of the winding W6 are separated from each other.

Adopting the configured integrated transformer assembly 1900 in the DC to DC converter reduces the DC to DC converter in size and weight. All of the windings W1 to W6 are wound around the center pole portion 2002, allowing the leakage inductances to decrease.

In addition, the first and second I-shaped cores 3000 and 4000 are disposed on upper side of the center pole portion 2002 to be relocatable in the upper surface of the center pole portion 2002. Therefore, relocating the first and second I-shaped cores 3000 and 4000 in parallel to one end surface of the center pole portion 2002 allows the areas of the magnetic paths in the gaps G1 and G2 to be easily adjusted.

Changing the area of the magnetic path in each of the gaps G1 and G2 permits the magnetic resistances of the first and second transformer assemblies, in other words, the magnetizing inductances to be changed, adjusting the output characteristic of the DC to DC converter.

Incidentally, it may be preferable that the gap G3 is longer than the other gaps G1 and G2. Setting the gap G3 to be larger than each of the gaps G1 and G2 allows inductances equivalently connected to the secondary windings W3 and W6 in series to decrease, making it possible to reduce the switching surge voltages due to the inductances.

Eleventh Embodiment

Figure 29:
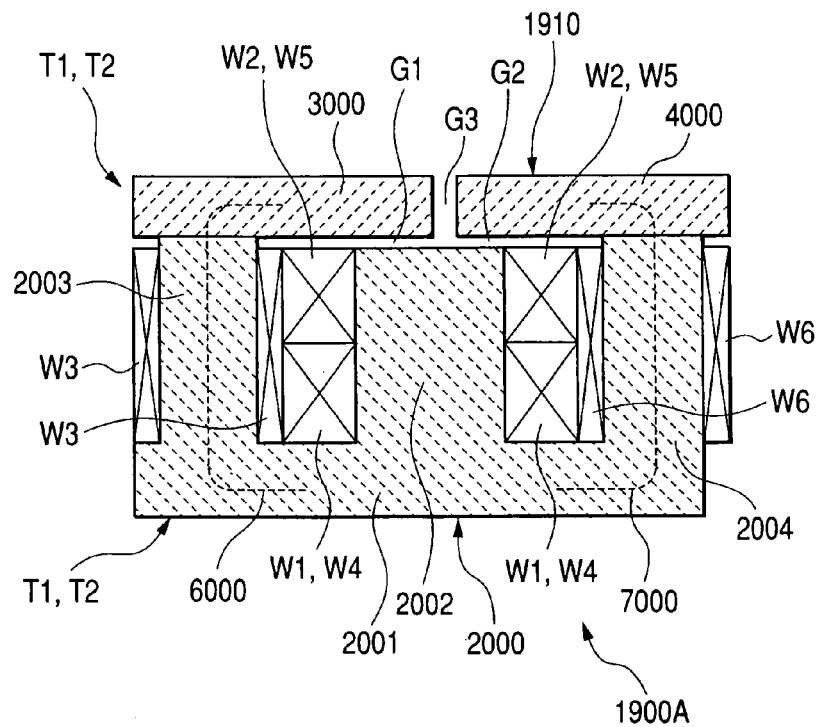
FIG. 29 is a schematic cross sectional view of an integrated transformer assembly along a center axis of each winding thereof according to an eleventh embodiment of the present invention.

A DC to DC converter according to an eleventh embodiment of the present invention will be described in accordance with FIG. 29.

In an integrated transformer according to the eleventh embodiment, the secondary windings W3 and W6 are separately wound around the first and second side walls 2003 and 2004, respectively.

That is, the first secondary winding W3 is wound around the first side wall 2003 to make an interlinkage with the first closed magnetic circuit 6000, and the second secondary winding is wound around the second side wall 2004 to make an interlinkage with the second closed magnetic circuit 7000.

This configuration obtains the effects which are the same as those obtained in the ten embodiment.

Moreover, this configuration allows the numbers of turns of the secondary windings W3 and W6 to easily increase while keeping the effects of the tenth embodiment.

Furthermore, this configuration makes easy wind the secondary windings W3 and W6 around the first and second side walls 2003 and 2004, respectively.

In the eleventh embodiment, the secondary windings W3 are W6 are disposed to be wound around the first and second side walls 2003 and 2004, respectively. However, the present invention is not limited to the structure.

That is, the secondary winding W3 may be disposed to be wound around a portion of the core assembly 1910 to make an interlinkage with the first closed magnetic circuit 6000, such as the base plate 2001 or the I-shaped core 3000. Similarly, the secondary winding W6 may be disposed to be wound around a portion of the core assembly 1910 to make an interlinkage with the second closed magnetic circuit 7000, such as the base plate 2001 or the I-shaped core 4000.

Twelfth Embodiment

A DC to DC converter according to an twelfth embodiment of the present invention.

The DC to DC converter according to the twelfth embodiment adopts a specific structure of the first transformer assembly T1 and the second transformer assembly T2. Other structures of the DC to DC converters are substantially identical with those of the DC to DC converter 1 shown in FIG. 1 so that the explanations of the other structures are omitted.

Figure 30:
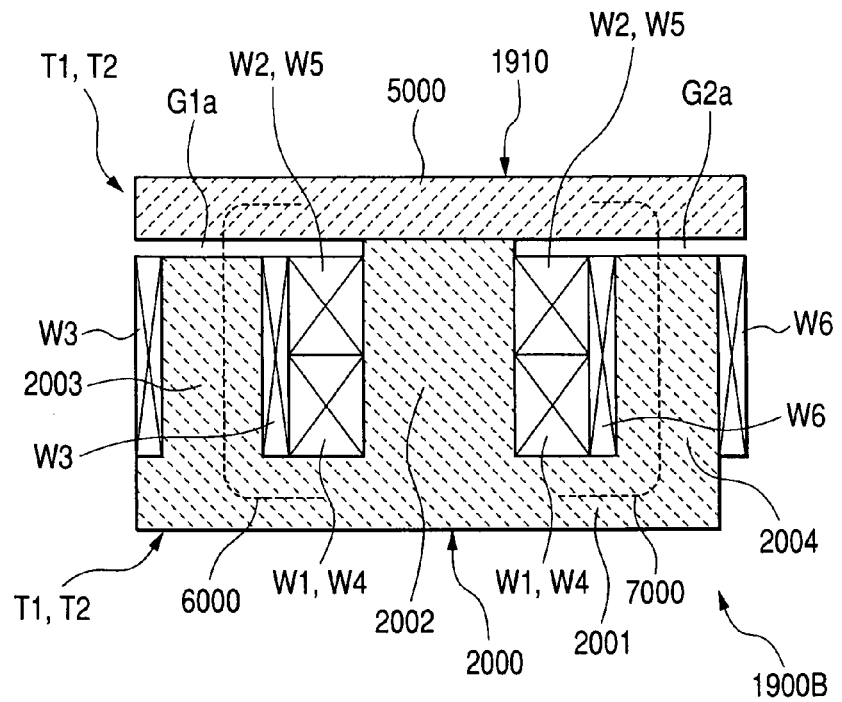
FIG. 30 is a schematic cross sectional view of an integrated transformer assembly along a center axis of each winding thereof according to a twelfth embodiment of the present invention.

As shown in FIG. 30, the first and second transformer assemblies T1 and T2 are integrated with each other to form an integrated transformer assembly 1900B.

The integrated transformer assembly 1900B is provided with a core assembly 1910 including the E-shaped core 2000, which has the same shape of the E-shaped core according to the tenth and eleventh embodiments.

The integrated transformer assembly 1900B is also provided with an I shaped core 5000.

The I-shaped core 5000 is disposed on upper side of the center pole portion 2002, the first and second side wall portions 2003 and 2004 to be relocatable in the upper surface of the center pole portion 2002. That is, the I-shaped core 3000 is mounted on one end surface of the center pole portion 2002 to form a gap G1a between the I-shaped core 5000 and the first side wall portion 2003, and to form a gap G2a between the I-shaped core 5000 and the second side wall portion 2004.

This structure provides a first closed magnetic path 6000 with the gap G1a passing through the I-shaped core 5000, the gap G1a, the first side wall portion 2003, the base plate 2001, the center pole portion 2002, and the I-shaped core 5000.

Similarly, this structure provides a second closed magnetic path 7000 with the gap G2a passing through the I-shaped core 5000, the gap G2a, the second side wall portion 2004, the base plate 2001, the center pole portion 2002, and the I-shaped core 5000.

The first primary winding W1 and the third primary winding W4 are integrated with each other and wound around the center pole portion 2002 by a predetermined number of turns. Similarly, the second primary winding W2 and the fourth primary winding W5 are integrated with each other and wound around the center pole portion 2002 by a predetermined number of turns. The secondary windings W3 and W6 are separately wound around the first and second side wall portions 2003 and 2004, respectively.

This configuration allows the numbers of turns of the secondary windings W3 and W6 to easily increase while keeping the effects of the tenth embodiment.

Adopting the configured integrated transformer assembly 1900B in the DC to DC converter makes the DC to DC converter compact.

In addition, the I-shaped core 5000 is disposed on upper side of the center pole portion 2002 to be movable in the upper surface of the center pole portion 2002. Therefore, relocating the first and second I-shaped cores 3000 and 4000 in parallel to one end surface of the center pole portion 2002 allows the areas of the magnetic paths in the gaps G1 and G2 to be easily adjusted.

Changing the area of the magnetic path in each of the gaps G1 and G2 permits the magnetic resistances of the first and second transformer assemblies, in other words, the magnetizing inductances to be changed, adjusting the output characteristic of the DC to DC converter.

The I-shaped core 5000 is disposed on upper side of the center pole portion 2002 to be movable in the upper surface of the center pole portion 2002. Therefore, relocating the I-shaped core 5000 in parallel to one end surface of the center pole portion 2002 allows the areas of the magnetic paths in the gaps G1a and G2a to be easily adjusted.

[Modification]

As a modification of the DC to DC converter, the gaps G1a and G2a are served for preventing magnetic saturations from being generated.

A part of the gap G1a and/or a part of the gap G2a may have a gap length that is zero.

In the modification, when high current is supplied to the integrated transformer assembly 1900B, the high current causes the parts each with the gap length of zero to be magnetically saturated. The parts at which the magnetic saturation are generated can be considered as gaps, which are similar to the remaining portions of the gaps G1a and G2a.

[Another Modification]

In an integrated transformer assembly 190C according to another modification of the integrated transformer assembly 190A, the first I-shaped core 3000a has a side surface 3000b which is opposite to a side surface 4000b of the second I-shaped core 4000a through the gap G3.

Figure 31:
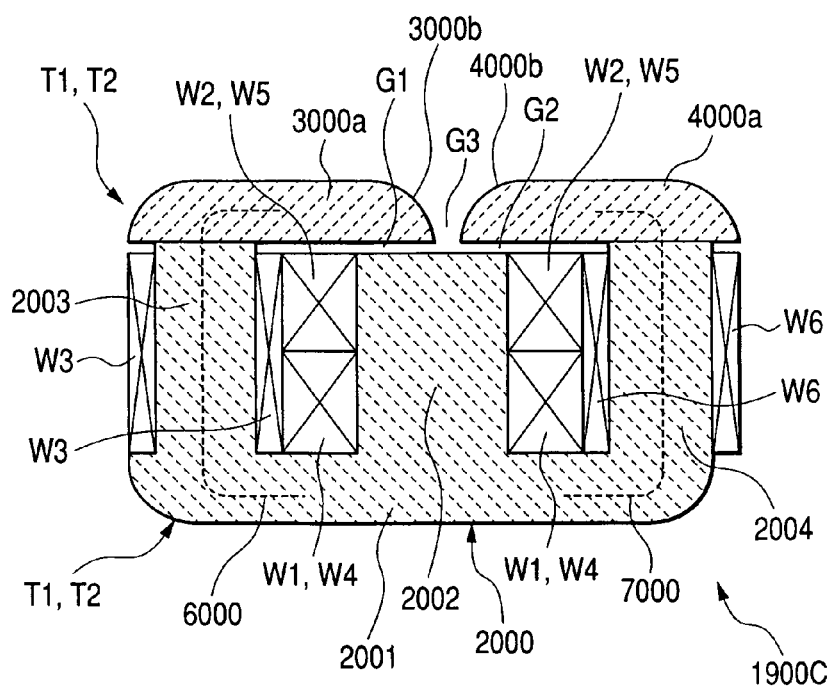
FIG. 31 is a schematic cross sectional view of an integrated transformer assembly along a center axis of each winding thereof according to an another modification of the twelfth embodiment of the present invention.

As shown in FIG. 31, the side surface 3000b of the first I-shaped core 3000a is tapered so that the area facing with the one end surface of the center pole portion 2002 is as large as possible. Similarly, the side surface 4000b of the second I-shaped core 4000a is tapered so that the area facing with the one end surface of the center pole portion 2002 is as large as possible.

These configurations of the first and second I-shaped cores 3000 and 4000 allow the magnetic flux in the closed magnetic circuit with the gap G3 to increase, and the magnetic flux passing through the gap G3 to decrease. Incidentally, the tapered surfaces 3000b and 4000b may be curved surfaces or flat surfaces.

In addition, further increasing the gap G3 allows the surge voltage to be more decrease.

As described above, the embodiments and modifications thereof obtain the following effects.

To begin with, the magnetic flux (ampere-turn) generated in each of the primary windings W1, W2, W4, and W5 of each of first and second transformer assemblies T1 and T2 is reversed according to the switching of the first and second switching elements Q1 and Q2. In particular, the flowing direction of the input current i1 is controlled to be directed to the first switching element Q1 side (Q1 is on state) or to the primary windings W5 and W2 (Q1 is off state). These switching operations allow the current direction with respect to the first capacitor C1 to be reversed, that is, i2 ↔ i2'. This permits the input current i1 to stably flow from the input DC power supply 2 into the first primary winding W1 and the third primary winding W4 in all of the operation modes.

Figure 32:
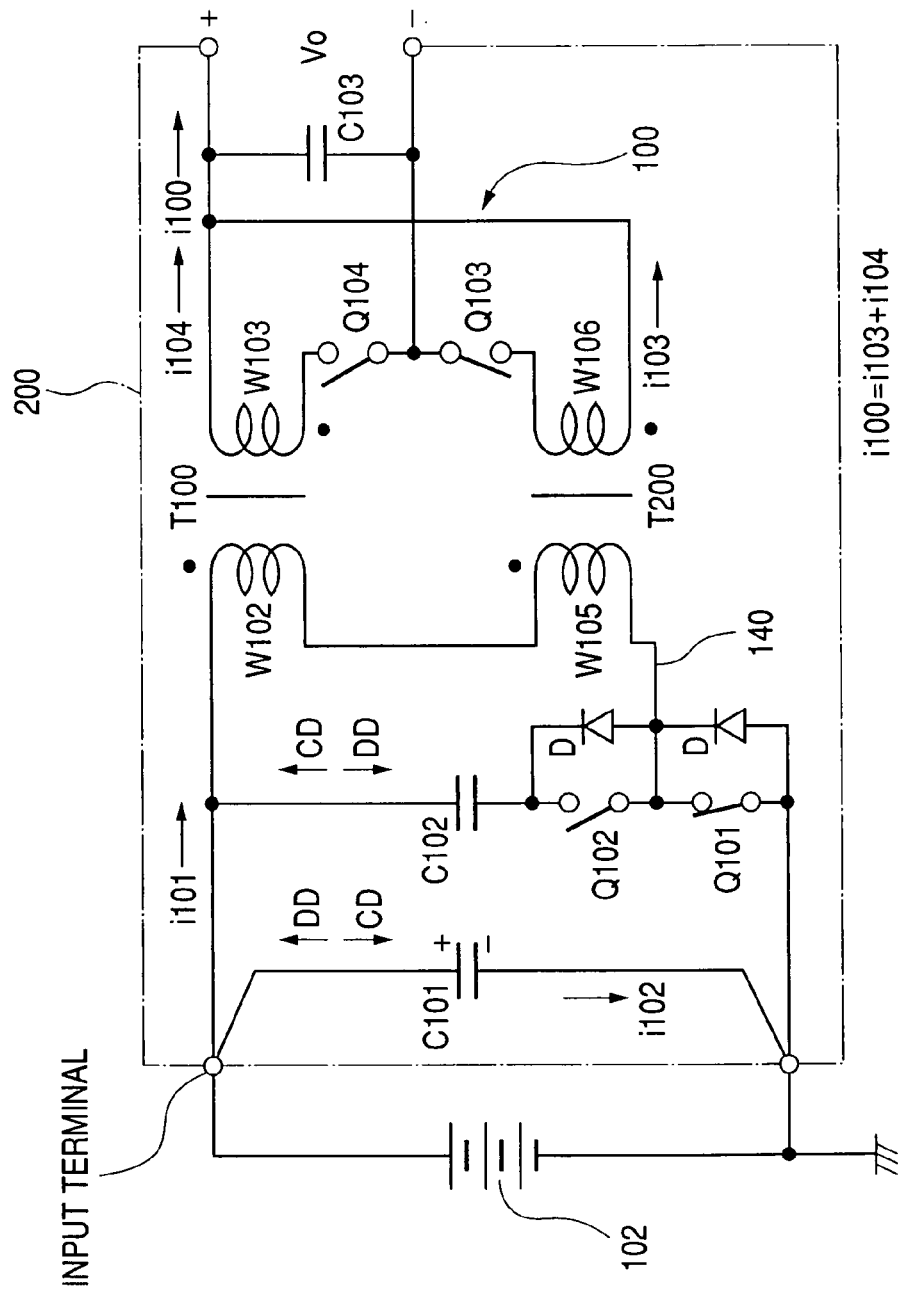
FIG. 32 is a circuit diagram of the Related Art.

That is, as compared with the structure shown in FIG. 32, the DC to DC converters according to the above embodiments and modifications prevent the input current i1 from flowing into the input DC power supply 2, thereby reducing ripple components included in the input current i1. This makes it possible to omit a large capacitance smoothing capacitor, which is required to be connected to the input DC power supply 102 in parallel in FIG. 32. In addition, reducing the capacitance of the first capacitor C1 as compared with the smoothing capacitor parallely connected to the input DC power supply 102 in FIG. 32, making the DC to DC converter compact.

Importance of reducing ripple components into input current in DC to DC converters has been well known, and therefore, it is possible to reduce electromagnetic noises in the DC to DC converters, and to downsize the DC to DC converters.

Alternately turning on the third and fourth switching elements Q3 and Q4 in synchronization with the turning on and off of the first switching element Q1 permits the output current to be continuously outputted through one of the switching elements Q3 and Q4. This results in that ripple components contained in the output current are reduced, allowing output choke coil to be omitted.

As compared with a DC to DC converter in that two rectifying elements execute full-wave rectification of output voltages between one end of the secondary winding and the center tap, and the other end thereof and the center tap, the DC to DC converters according to these embodiments and modifications thereof allow the breakdown voltage of the rectifying element, such as the smoothing capacitor, to decrease.

Because the magnetizing DC components generated in the second transformer assembly T2, that is, DC components contained in the total amount of change in current in each of the primary windings W4 and W5, are reduced, it is possible to reduce DC bias magnetic field and magnetic saturation in the second transformer assembly T2. These reducing the DC bias magnetic field and the magnetic saturation permit the gap width of the core in the second transformer assembly T2 to be short, resulting in downsizing the core of the second transformer assembly T2.

It is possible to regulate ripple components contained in the output current, thereby reducing the ripple components in a suitable usable range.

In addition, reducing ripple components in each of the input current and the output current, realizing the soft switching, and reducing copper losses in the transformer assemblies T1 and T2, enables the energy efficiency of the DC to DC converters according to the present invention to be improved.

Moreover, advancing the turn on timings of the third switching element Q3 and the fourth switching element Q4 to short-circuit them allows surge voltages generated at the switching timings to be reduced, and power generated at the switching timings to be electromagnetically collected by the transformer assemblies T1 and T2.

Furthermore, it is possible for the simplified controller to switch the power transfer direction.

While there has been described what is at present considered to be the embodiments and modifications of the invention, it will be understood that various modifications which are not described yet may be made therein, and it is intended to cover in the appended claims all such modifications as fall within the true spirit and scope of the invention.

What is claimed is:

1. A DC to DC converter interposed between a first voltage system and a second voltage system for transferring power between the first and second voltage system, wherein said first voltage system has a DC power supply and a power supply switch connected to each other in series, said DC to DC converter comprising:

a smoothing capacitor coupled between a positive terminal and a negative terminal of the DC power supply of the first voltage system, and to the series connected DC power supply and the power supply switch in parallel;

a magnetic circuit having a first primary winding, a second primary winding, a third primary winding, a fourth primary winding, a first secondary winding, and a second secondary winding, the first and second primary windings being magnetically coupled to the first secondary winding, the third and fourth primary windings being magnetically coupled to the second secondary winding, the first and third primary windings being coupled in series to form a first coil member, the second and fourth primary windings being coupled in series to form a second coil member, one end of the first coil member being coupled to the positive terminal of the DC power supply of the first voltage system, the first and second secondary windings being coupled to the second voltage system;

a capacitor coupled between the negative terminal of the DC power supply of the first voltage system and one end of the second coil member;

a switching element coupled between the negative terminal of the DC power supply of the first voltage system and a connecting point at which the other end of the first coil member and the other end of the second coil member are connected to each other; and a controller coupled to the power supply switch and configured to, when the power supply switch is off state, transfer power from the second voltage system to the first voltage system through the magnetic circuit to precharge voltage based on the transferred power to the smoothing capacitor and to turn on the power switch after the precharge is completed.

2. A DC to DC converter according to claim 1, wherein, when precharging the smoothing capacitor, said controller gradually increases the voltage applied to the smoothing capacitor.

3. A DC to DC converter according to claim 1, wherein said controller, after the precharge to the smoothing capacitor is completed, turns on the power supply switch to transfer power from the first voltage system to the second voltage system.

* * * * *